(12) United States Patent
Yoshikawa et al.

(10) Patent No.: US 7,087,892 B2
(45) Date of Patent: Aug. 8, 2006

(54) LIGHT SCANNER AND IMAGE FORMING APPARATUS USING THE SAME

(75) Inventors: Masanori Yoshikawa, Neyagawa (JP); Akinobu Okuda, Toyonaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 496 days.

(21) Appl. No.: 10/645,759

(22) Filed: Aug. 19, 2003

(65) Prior Publication Data

US 2005/0098716 A1    May 12, 2005

Related U.S. Application Data

(63) Continuation-in-part of application No. 09/928,228, filed on Aug. 10, 2001, now abandoned.

(30) Foreign Application Priority Data

Aug. 18, 2000    (JP)    .............................. 2000-248370

(51) Int. Cl.
G01N 21/86    (2006.01)
G02B 26/08    (2006.01)

(52) U.S. Cl. .................... 250/235; 250/216; 250/208.1; 359/205

(58) Field of Classification Search ................ 250/205, 250/216, 208.1, 234–236; 359/205, 208, 359/212, 216–218
See application file for complete search history.

(56) References Cited

U.S. PATENT DOCUMENTS

| | | | |
|---|---|---|---|
| 5,570,232 A | 10/1996 | Yoshikawa et al. | |
| 5,724,172 A | 3/1998 | Ota | |
| 5,742,068 A | 4/1998 | Dybdahl et al. | |
| 5,751,464 A | 5/1998 | Yoshikawa et al. | |
| 5,801,869 A | 9/1998 | Yoshikawa et al. | |
| 6,091,533 A | 7/2000 | Iizuka | |
| 6,137,617 A | 10/2000 | Yoshikawa et al. | |
| 6,172,788 B1 | 1/2001 | Suzuki et al. | |
| 6,411,419 B1 | 6/2002 | Kamioka | |
| 6,504,639 B1 | 1/2003 | Yoshikawa et al. | |

FOREIGN PATENT DOCUMENTS

| | | |
|---|---|---|
| JP | 3-200114 | 9/1991 |
| JP | 8-94952 | 4/1996 |
| JP | 8-94953 | 4/1996 |
| JP | 11-30710 | 2/1999 |
| JP | 11-153764 | 6/1999 |
| JP | 2001-100130 | 4/2001 |

Primary Examiner—Stephone B. Allen
(74) Attorney, Agent, or Firm—Hamre, Schumann, Mueller & Larson, P.C.

(57) ABSTRACT

A light scanner includes a semiconductor laser, a polygon mirror, a first imaging optical system for guiding a light beam from the laser to the deflection surface of the polygon mirror, a second imaging optical system of a single curved mirror for guiding the light beam from the polygon mirror to a photosensitive drum, and a photodiode for detecting the light beam scanned by the polygon mirror. The first imaging optical system, the polygon mirror, and the second imaging optical system are located at different positions in the sub-scanning direction so that the light beam from the first imaging optical system enters the deflection surface obliquely, and the light beam from the polygon mirror enters the curved mirror obliquely.

38 Claims, 16 Drawing Sheets

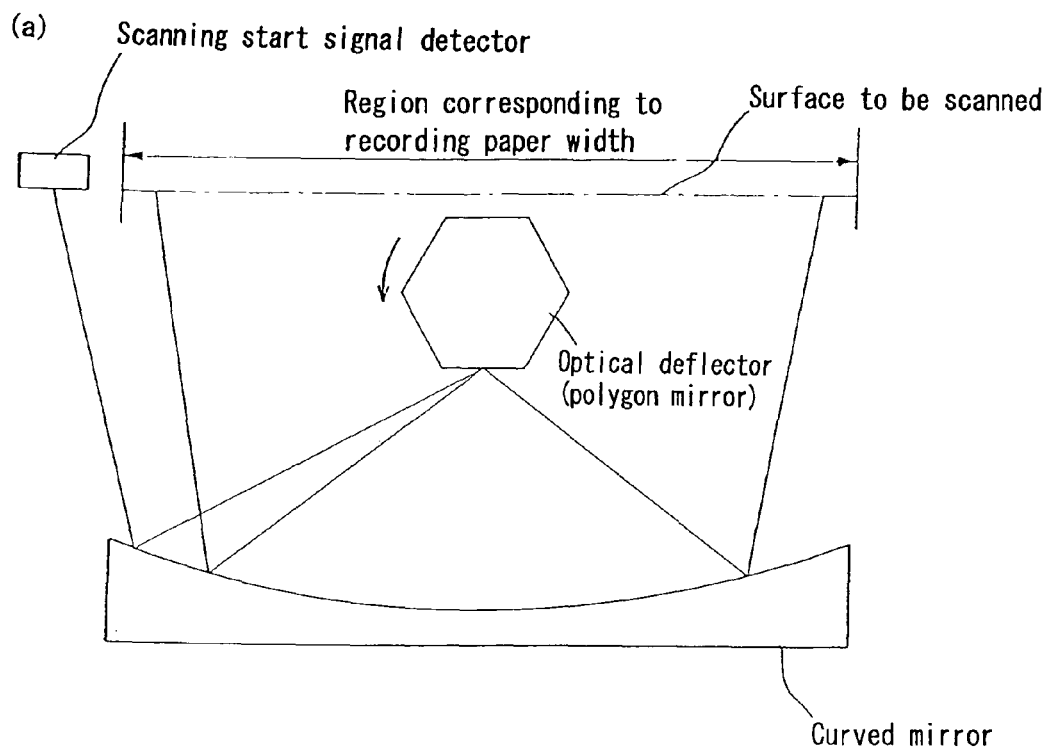
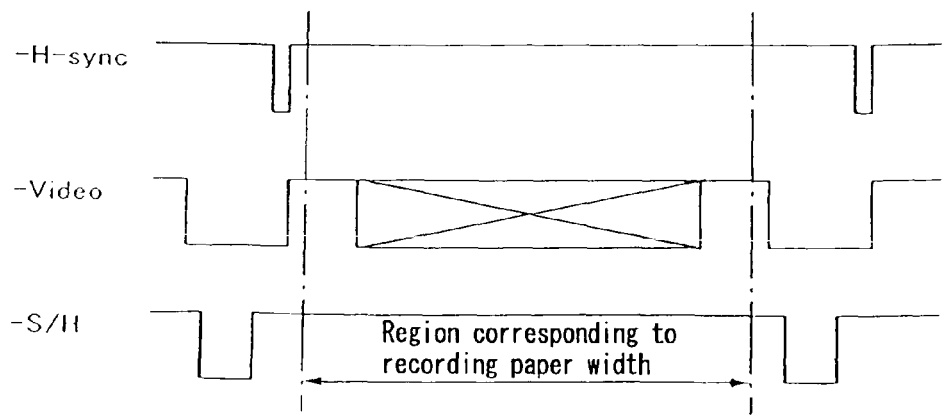
F I G. 10

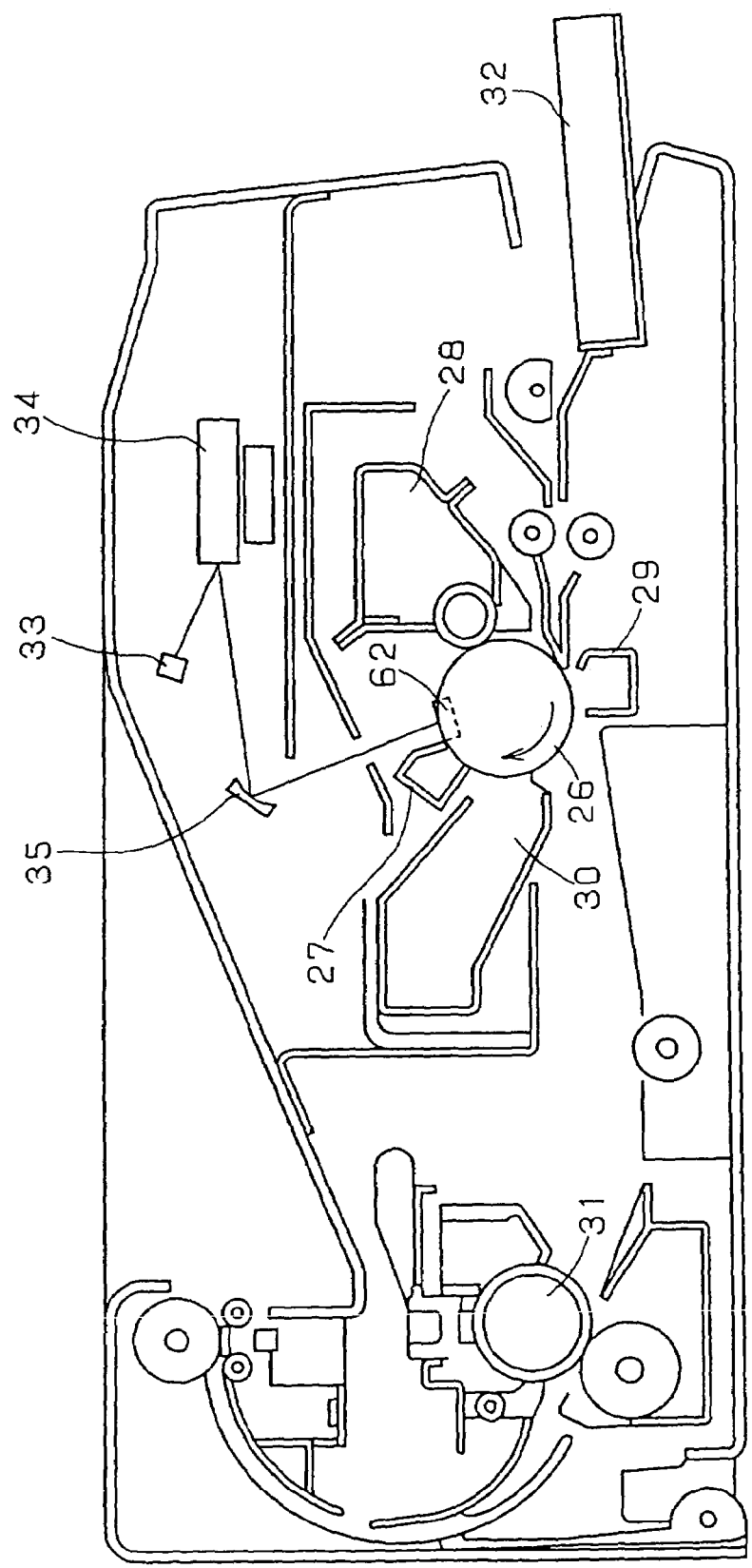
F I G. 15

LIGHT SCANNER AND IMAGE FORMING APPARATUS USING THE SAME

This application is a continuation-in-part of application Ser. No. 09/928,228 filed on Aug. 10, 2001, now abandoned.

BACKGROUND OF THE INVENTION

1. Field of the Invention

The present invention relates to a light scanner used in, e.g., a laser beam printer, a laser facsimile or a digital copier, and to an image forming apparatus using the same.

2. Description of the Related Art

Many light scanners used in, e.g., laser beam printers include the following: a semiconductor laser used as a light source; a polygon mirror used as an optical deflector; a first imaging optical system that forms a line image on the optical deflector by focusing a light beam from the light source so as to correct a tilt of the deflection surface of the optical deflector; a second imaging optical system that forms a uniform spot on the surface to be scanned at constant velocity; a scanning start signal detector that detects the light beam scanned by the optical deflector; and a detecting optical system that focuses the light beam from the light source on the scanning start signal detector.

The second imaging optical system of a conventional light scanner includes a plurality of large glass lenses, which are so-called f-θ lenses. However, the f-θ lens is expensive and is difficult to reduce in size. To achieve miniaturization and low cost, a light scanner using a single curved mirror for the second imaging optical system has been proposed recently (see JP 8(1996)-94953 A, JP 11(1999)-30710 A or the like).

The light scanners of those documents are described as a device that allows a light beam from the curved mirror to be guided directly on the image surface. Actually, however, a reflecting mirror has to be placed between the curved mirror and the surface to be scanned (i.e., a photosensitive drum) so as to guide the light beam on the surface to be scanned. This is because the angle of reflection of the light beam from the curved mirror is small. For the light scanner of JP 8(1996)-94953 A, the second imaging optical system requires a long lens for correcting a tilt of the deflection surface of the optical deflector in addition to the curved mirror. For the light scanner of JP 11(1999)-30710 A, the cross section of the curved mirror in the sub-scanning direction is not arc-shaped, but is expressed by a quartic polynomial. Thus, there is difficulty in processing and measuring the curved mirror.

SUMMARY OF THE INVENTION

Therefore, with the foregoing in mind, it is an object of the present invention to provide a light scanner and an image forming apparatus using the same, the light scanner having a simple configuration that can achieve favorable optical performance and no wavelength dependence by guiding a light beam from a single curved mirror directly to the surface to be scanned and a scanning start signal detector without using a reflecting mirror and allowing the curved mirror to have a shape that is relatively easy to process and measure.

In order to attain the above-mentioned object, a light scanner according to a first configuration of the present invention includes the following: a light source portion for emitting a light beam having a predetermined wavelength; an optical deflector for scanning the light beam from the light source portion; a first imaging optical system placed between the light source portion and the optical deflector for guiding the light beam from the light source portion to the deflection surface of the optical deflector; a second imaging optical system of a single curved mirror placed between the optical deflector and a surface to be scanned for guiding the light beam from the optical deflector to the surface to be scanned; a scanning start signal detector for detecting the light beam scanned by the optical deflector; and a detecting optical system placed between the optical deflector and the scanning start signal detector for guiding the light beam scanned by the optical deflector to the scanning start signal detector. The first imaging optical system, the optical deflector, and the second imaging optical system are located at different positions in the sub-scanning direction so that the light beam from the first imaging optical system enters obliquely with respect to a plane containing the normal to the deflection surface of the optical deflector and being parallel to the main scanning direction, and the light beam from the optical deflector enters obliquely with respect to a plane containing the normal to the curved mirror at its vertex and being parallel to the main scanning direction (i.e., a Y-Z plane). An angle θM formed by the optical axis of the light beam traveling to the curved mirror and the Y-Z plane satisfies 10<θM<35. The curved mirror also is part of the detecting optical system.

According to the first configuration of the light scanner, the second imaging optical system and the detecting optical system are composed of a single curved mirror, and the curved mirror reflects the light beam at an angle large enough to satisfy 10<θM. Therefore, the degree of freedom in arrangement of the curved mirror and the optical deflector with respect to the surface to be scanned is increased, so that the light beam from the curved mirror can be guided directly to the surface to be scanned and the scanning start signal detector without using a reflecting mirror. In this case, θM<35 shows the range over which aberration can be corrected. Since the detecting optical system is composed of the curved mirror alone, chromatic aberration due to the wavelength of the light source is eliminated. This makes it possible to vary the wavelength of the light source easily in accordance with particular applications. Moreover, since the transmission loss is reduced even with a so-called short-wavelength light source, the power of the light source can be utilized effectively.

To correct an f-θ error, a curvature of field and the bend of a scanning line, the shape of the curved mirror is as follows: the radius of curvature is different in the main scanning direction and in the sub-scanning direction; the mirror surface is a free curved surface such that a plane defined by the normals of respective points on the generatrix is twisted; and the cross section in the sub-scanning direction is in the form of an arc at each position in the main scanning direction.

When a light beam enters the curved mirror obliquely with respect to the cross section in the sub-scanning direction at a large angle of 10<θM, larger aberration is caused on the mirror surface of the curved mirror.

To correct the aberration, the present invention provides the configuration in which the light beam from the first imaging optical system enters obliquely with respect to the plane containing the normal to the deflection surface of the optical deflector and being parallel to the main scanning direction. Also, the present invention makes conditions for each angle of inclination for correcting the aberration.

To obtain a favorable spot, it is preferable that, in the cross section taken along the sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction. It is preferable that the following equation is satisfied to obtain a more favorable spot:

$$1.6 < \theta M/\theta P + 0.98 L/(L+D) < 2.2 \quad \text{Eq. 4}$$

where $\theta P$ is the angle between the optical axis of the light beam from the first imaging optical system and the normal to the deflection surface of the optical deflector, L is the distance between the deflection surface of the optical deflector and the vertex of the curved mirror, and D is the distance between the vertex of the curved mirror and the surface to be scanned.

Aberration in an oblique direction is caused in the ranges above the upper limit and below the lower limit of Equation 4.

It is preferable that the following equations are satisfied to achieve higher resolution:

$$1.86 < \theta M/\theta P + 0.98 L/(L+D) < 1.94 \text{ and} \quad \text{Eq. 5}$$

$$0.48 < L/(L+D) < 0.75. \quad \text{Eq. 6}$$

To eliminate the influence of aberration due to the wavelength of the light source, the second imaging optical system and the detecting optical system are composed of the same curved mirror alone.

In the first configuration of the light scanner, it is preferable that the light beam emitted from the light source portion has a wavelength of 500 nm or less. This preferred example can provide a light scanner capable of reducing transmission loss and recording with high resolution.

In the first configuration of the light scanner, it is preferable that, in the cross section taken along the sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction. This preferred example allows the reflected and incident light beams to be defined as the positive and negative directions, respectively. Thus, aberration caused by the oblique incidence of a light beam can be corrected to provide a favorable spot. In such a case, it is preferable that the following equation is satisfied:

$$1.6 < \theta M/\theta P + 0.98 L/(L+D) < 2.2 \quad \text{Eq. 7}$$

where $\theta P$ is the angle between the optical axis of the light beam from the first imaging optical system and the normal to the deflection surface of the optical deflector, L is the distance between the deflection surface of the optical deflector and the vertex of the curved mirror, and D is the distance between the vertex of the curved mirror and the surface to be scanned.

When the positional relationship between the first imaging optical system, the optical deflector, and the second imaging optical system satisfies the conditions given by Equation 7, aberration caused by the oblique incidence of a light beam can be corrected properly.

Moreover, in such a case, it is preferable that the following equation is satisfied:

$$1.86 < \theta M/\theta P + 0.98 L/(L+D) < 1.94. \quad \text{Eq. 8}$$

When the positional relationship between the first imaging optical system, the optical deflector, and the second imaging optical system satisfies the conditions given by Equation 8, aberration caused by the oblique incidence of a light beam can be corrected more completely.

In the first configuration of the light scanner, it is preferable that the following equation is satisfied:

$$0.48 < L/(L+D) < 0.75 \quad \text{Eq. 9}$$

where L is the distance between the deflection surface of the optical deflector and the vertex of the curved mirror and D is the distance between the vertex of the curved mirror and the surface to be scanned.

When the positional relationship between the optical deflector, the second imaging optical system and the surface to be scanned satisfies the conditions given by Equation 9, aberration can be corrected even if the curved mirror has a large angle of reflection of $10 < \theta M$. The aberration is caused in the range below the lower limit of Equation 9, and the achievement of high resolution becomes difficult in the range above the upper limit because the beam diameter in the sub-scanning direction changes significantly between the scanning center and the periphery.

In the first configuration of the light scanner, it is preferable that the curved mirror has an arc-shaped cross section in the sub-scanning direction.

According to these preferred examples, the curved mirror can have a shape that is relatively easy to process and measure.

In the first configuration of the light scanner, it is preferable that the curved mirror has a shape for correcting the bend of a scanning line caused by oblique incidence of the light beam.

In the first configuration of the light scanner, it is preferable that the curved mirror has a shape that is asymmetrical with respect to the Y-Z plane.

In the first configuration of the light scanner, it is preferable that the curved mirror is twisted so that the normal at each point, except the vertex, on a generatrix is not contained in the Y-Z plane, the generatrix being a curved line intersecting with the Y-Z plane.

According to these preferred examples, the optical system can be simplified and the bend of a scanning line can be corrected while correcting the aberration caused by the oblique incidence of a light beam. In such a case, it is preferable that the angle formed by the normal at each point on the generatrix and the Y-Z plane becomes larger as the distance between the vertex and each point increases. Moreover, in such a case, it is preferable that the direction in which the normal at each point on the generatrix tilts from the Y-Z plane is positive when the direction in which a reflected light beam from the curved mirror tilts from an incident light beam from the deflection surface of the optical deflector is positive.

In the first configuration of the light scanner, it is preferable that the curved mirror is an anamorphic mirror whose radius of curvature at its vertex is different in the main scanning direction and in the sub-scanning direction.

In the first configuration of the light scanner, it is preferable that the curved mirror has concave mirror surfaces in the main scanning direction and in the sub-scanning direction.

In the first configuration of the light scanner, it is preferable that the curved mirror has a mirror surface whose refractive power in the sub-scanning direction is different in the center and the periphery of the main scanning direction.

In the first configuration of the light scanner, it is preferable that the curved mirror is shaped so that a radius of curvature of a cross section in the sub-scanning direction is not affected by the shape of a cross section in the main scanning direction.

In the first configuration of the light scanner, it is preferable that the first imaging optical system converges the light beam from the light source portion in the main scanning direction.

According to these preferred examples, the curvature of field in the main scanning and sub-scanning directions and the f-θ characteristics can exhibit favorable performance.

In the first configuration of the light scanner, it is preferable that the light source portion includes a wavelength-variable light source and a wavelength control portion. Since the spot size is proportional substantially to the wavelength of the light source, this preferred example can control arbitrarily the size of a spot formed on the surface to be scanned by controlling the wavelength. In addition, the second image forming optical system and the detecting optical system are composed of the same curved mirror alone, which completely eliminates chromatic aberration. Therefore, the resolution can be changed arbitrarily without degrading other properties such as the f-θ characteristics.

In the first configuration of the light scanner, it is preferable that the light scanner further includes a light combining means, and that the light source portion has at least two light sources and the light combining means is placed between the light source portion and the optical deflector so as to combine a plurality of light beams emitted from the at least two light sources. According to this preferred example, the light scanner can use at least two light beams for a single scanning, so that it can scan line image information at least twice as much as that scanned by a light scanner including one light source.

As the light combining means, e.g., a dichroic mirror may be used. The dichroic mirror can combine light beams efficiently because it selects the wavelength to be reflected or transmitted. A half mirror also can be used as the light combining means. The half mirror can achieve the combination of light at low cost because it is processed easily.

In such a case, it is preferable that the light scanner further includes a light separating means placed between the optical deflector and the surface to be scanned so as to separate the light beam combined by the light combining means into a plurality of light beams. This preferred example enables formation of two or more line images on the surface to be scanned at the same time with a single scanning, thereby making the image formation rate at least twice as fast.

As the light separating means, a diffraction grating, a dichroic mirror, or the like can be used. The diffraction grating diffracts an incident light beam at different angles depending on the wavelength, and thus light can be separated at high efficiency and low cost. The dichroic mirror can separate a light beam efficiently because it selects the wavelength to be reflected or transmitted.

In such a case, it is preferable that light beams emitted from the at least two light sources have different wavelengths. Since the second imaging optical system and the detecting optical system are composed of the same curved mirror alone, general chromatic aberration is not caused at all. Therefore, image formation with high resolution can be achieved even when using light of different wavelengths.

A light scanner according to a second configuration of the present invention includes the following: a light source portion for emitting a light beam having a predetermined wavelength; an optical deflector for scanning the light beam from the light source portion; a first imaging optical system placed between the light source portion and the optical deflector for guiding the light beam from the light source portion to a deflection surface of the optical deflector; a second imaging optical system of a single curved mirror placed between the optical deflector and a surface to be scanned for guiding the light beam from the optical deflector to the surface to be scanned; a scanning start signal detector for detecting the light beam scanned by the optical deflector; and a detecting optical system placed between the optical deflector and the scanning start signal detector for guiding the light beam scanned by the optical deflector to the scanning start signal detector. The light source portion, the first imaging optical system, the optical deflector, and the second imaging optical system are located at different positions in the sub-scanning direction so that the light beam from the first imaging optical system enters obliquely with respect to a plane containing the normal to the deflection surface of the optical deflector and being parallel to the main scanning direction, and the light beam from the optical deflector enters obliquely with respect to a plane containing the normal to the curved mirror at its vertex and being parallel to the main scanning direction (i.e., a Y-Z plane). An angle θM formed by the optical axis of the light beam traveling to the curved mirror and the Y-Z plane satisfies 10<θM<35. The light beam traveling from the curved mirror to the surface to be scanned is substantially equal to that traveling from the curved mirror to the scanning start signal detector.

According to the second configuration of the light scanner, the second imaging optical system is composed of a single curved mirror, and the curved mirror reflects the light beam at an angle large enough to satisfy 10<θM. Therefore, the degree of freedom in arrangement of the curved mirror and the optical deflector with respect to the surface to be scanned is increased, so that the light beam from the curved mirror can be guided directly to the surface to be scanned without using a reflecting mirror. Moreover, since the light beam guided to the surface to be scanned is substantially equal to that to the scanning start signal detector, a scanning start signal can be obtained that corresponds to the characteristics of the light scanner (e.g., a beam diameter).

A light scanner according to a third configuration of the present invention includes the following: a light source portion for emitting a light beam having a predetermined wavelength; an optical deflector for scanning the light beam from the light source portion; a first imaging optical system placed between the light source portion and the optical deflector for guiding the light beam from the light source portion to a deflection surface of the optical deflector; a second imaging optical system of a single curved mirror placed between the optical deflector and a surface to be scanned for guiding the light beam from the optical deflector to the surface to be scanned; a scanning start signal detector for detecting the light beam scanned by the optical deflector; and a detecting optical system placed between the optical deflector and the scanning start signal detector for guiding the light beam scanned by the optical deflector to the scanning start signal detector. The first imaging optical system, the optical deflector, and the second imaging optical system are located at different positions in the sub-scanning direction so that the light beam from the first imaging optical system enters obliquely with respect to a plane containing the normal to the deflection surface of the optical deflector and being parallel to the main scanning direction, and the light beam from the optical deflector enters obliquely with respect to a plane containing the normal to the curved mirror at its vertex and being parallel to the main scanning direction (i.e., a Y-Z plane). The light beam traveling from the curved mirror to the surface to be scanned is substantially equal to that traveling from the curved mirror to the scanning start signal detector.

The third configuration of the light scanner allows the second imaging optical system to be composed of a single mirror, thus achieving low cost and miniaturization. In addition, the light beam from the optical deflector enters the curved mirror obliquely with respect to the sub-scanning direction, which eliminates the need for an optical path separating means, such as a half mirror. Moreover, since the light beam guided to the surface to be scanned is substantially equal to that to the scanning start signal detector, a scanning start signal can be obtained that corresponds to the characteristics of the light scanner (e.g., a beam diameter).

A light scanner according to a fourth configuration of the present invention includes the following: a light source portion for emitting a light beam having a predetermined wavelength; an optical deflector for scanning the light beam from the light source portion; a first imaging optical system placed between the light source portion and the optical deflector for guiding the light beam from the light source portion to a deflection surface of the optical deflector; a second imaging optical system of a single curved mirror placed between the optical deflector and a surface to be scanned for guiding the light beam from the optical deflector to the surface to be scanned; a scanning start signal detector for detecting the light beam scanned by the optical deflector; and a detecting optical system placed between the optical deflector and the scanning start signal detector for guiding the light beam scanned by the optical deflector to the scanning start signal detector. The light source portion, the first imaging optical system, the optical deflector, and the second imaging optical system are located at different positions in the sub-scanning direction so that the light beam from the first imaging optical system enters obliquely with respect to a plane containing the normal to the deflection surface of the optical deflector and being parallel to the main scanning direction, and the light beam from the optical deflector enters obliquely with respect to a plane containing the normal to the curved mirror at its vertex and being parallel to the main scanning direction (i.e., a Y-Z plane). An angle $\theta M$ formed by the optical axis of the light beam traveling to the curved mirror and the Y-Z plane satisfies $10<\theta M<35$. The light beam traveling from the curved mirror to the surface to be scanned is substantially equal to that traveling from the curved mirror to the scanning start signal detector. The light source portion is turned on so as to perform automatic power control (i.e., APC) operation at any time during the period between the completion of the present scanning of a printing region followed by transmission of a light beam through a portion of the surface to be scanned that corresponds to the end of a recording paper and the detection of a light beam of the next scanning by the scanning start signal detector.

Besides the effect obtained by the second configuration, the fourth configuration of the light scanner can simplify the on-off control sequence of the semiconductor laser (i.e., the light source portion) in the following manner: the APC operation is performed at any time during the period between the transmission of a light beam through the end of a recording paper and the detection of a light beam of the next scanning by the scanning start signal detector. Since there is no region where the semiconductor laser (i.e., the light source portion) must be turned off, there is sufficient time to perform the APC operation. Moreover, the effective image region (i.e., the image-recordable region on the surface to be scanned) can be broadened.

A light scanner according to a fifth configuration of the present invention includes the following: a light source portion for emitting a light beam having a predetermined wavelength; an optical deflector for scanning the light beam from the light source portion; a first imaging optical system placed between the light source portion and the optical deflector for guiding the light beam from the light source portion to a deflection surface of the optical deflector; a second imaging optical system of a single curved mirror placed between the optical deflector and a surface to be scanned for guiding the light beam from the optical deflector to the surface to be scanned; a scanning start signal detector for detecting the light beam scanned by the optical deflector; and a detecting optical system placed between the optical deflector and the scanning start signal detector for guiding the light beam scanned by the optical deflector to the scanning start signal detector. The first imaging optical system, the optical deflector, and the second imaging optical system are located at different positions in the sub-scanning direction so that the light beam from the first imaging optical system enters obliquely with respect to a plane containing the normal to the deflection surface of the optical deflector and being parallel to the main scanning direction, and the light beam from the optical deflector enters obliquely with respect to a plane containing the normal to the curved mirror at its vertex and being parallel to the main scanning direction (i.e., a Y-Z plane). The light beam traveling from the curved mirror to the surface to be scanned is substantially equal to that traveling from the curved mirror to the scanning start signal detector. The light source portion is turned on so as to perform automatic power control (i.e., APC) operation at any time during the period between the completion of the present scanning of a printing region followed by transmission of a light beam through a portion of the surface to be scanned that corresponds to the end of a recording paper and the detection of a light beam of the next scanning by the scanning start signal detector.

Besides the effect obtained by the third configuration, the fifth configuration of the light scanner can simplify the on-off control sequence of the semiconductor laser (i.e., the light source portion) in the following manner: the APC operation is performed at any time during the period between the transmission of a light beam through the end of a recording paper and the detection of a light beam of the next scanning by the scanning start signal detector. Since there is no region where the semiconductor laser (i.e., the light source portion) must be turned off, there is sufficient time to perform the APC operation. Moreover, the effective image region (i.e., the image-recordable region on the surface to be scanned) can be broadened.

An image forming apparatus according to a first configuration of the present invention includes the light scanner of the present invention.

The first configuration of the image forming apparatus can achieve an image forming apparatus with small size, low cost, high resolution, and high speed.

An image forming apparatus according to a second configuration of the present invention includes the following: a plurality of image forming units for different colors, each including a developing device and a photosensitive member and being held to form a cylinder; a conveying means for moving each of the image forming units between an image forming position and a waiting position by rotating the image forming units simultaneously around the axis of the cylinder; a transfer means for forming a color toner image on a member to be transferred by bringing the photosensitive member of the image forming unit at the image forming position into contact with the member to be transferred and successively transferring toner images of different colors formed on each of the photosensitive members to the member to be transferred in accordance with the switching of the image forming units to be positioned in the image forming position so as to superimpose the toner images of different colors; and a light scanner for exposing the photosensitive member. The light scanner of the present invention is used as the light scanner.

The second configuration of the image forming apparatus can achieve a color image forming apparatus with small size, low cost, high resolution, and high speed by using the light scanner of the present invention in the color image forming apparatus having the above configuration and by optimizing arrangement of the curved mirror and the angle of reflection a light beam.

In the second configuration of the image forming apparatus, it is preferable that the curved mirror constituting the second imaging optical system of the light scanner is located close to the axis of the cylinder. This preferred example enables effective utilization of space in the apparatus, thus achieving a small image forming apparatus.

In the second configuration of the image forming apparatus, it is preferable that 12.5<θM<17.5 is satisfied.

BRIEF DESCRIPTION OF THE DRAWINGS

FIG. 10 is a schematic view illustrating the advantage of a curved mirror to be used as the second imaging optical system and the detecting optical system according to the first embodiment of the present invention.

FIG. 15 is a schematic cross sectional view showing an image forming apparatus according to a third embodiment of the present invention.

DESCRIPTION OF THE PREFERRED EMBODIMENTS

Hereinafter, the present invention will be described more specifically by way of embodiments.

First Embodiment

Figure 1:
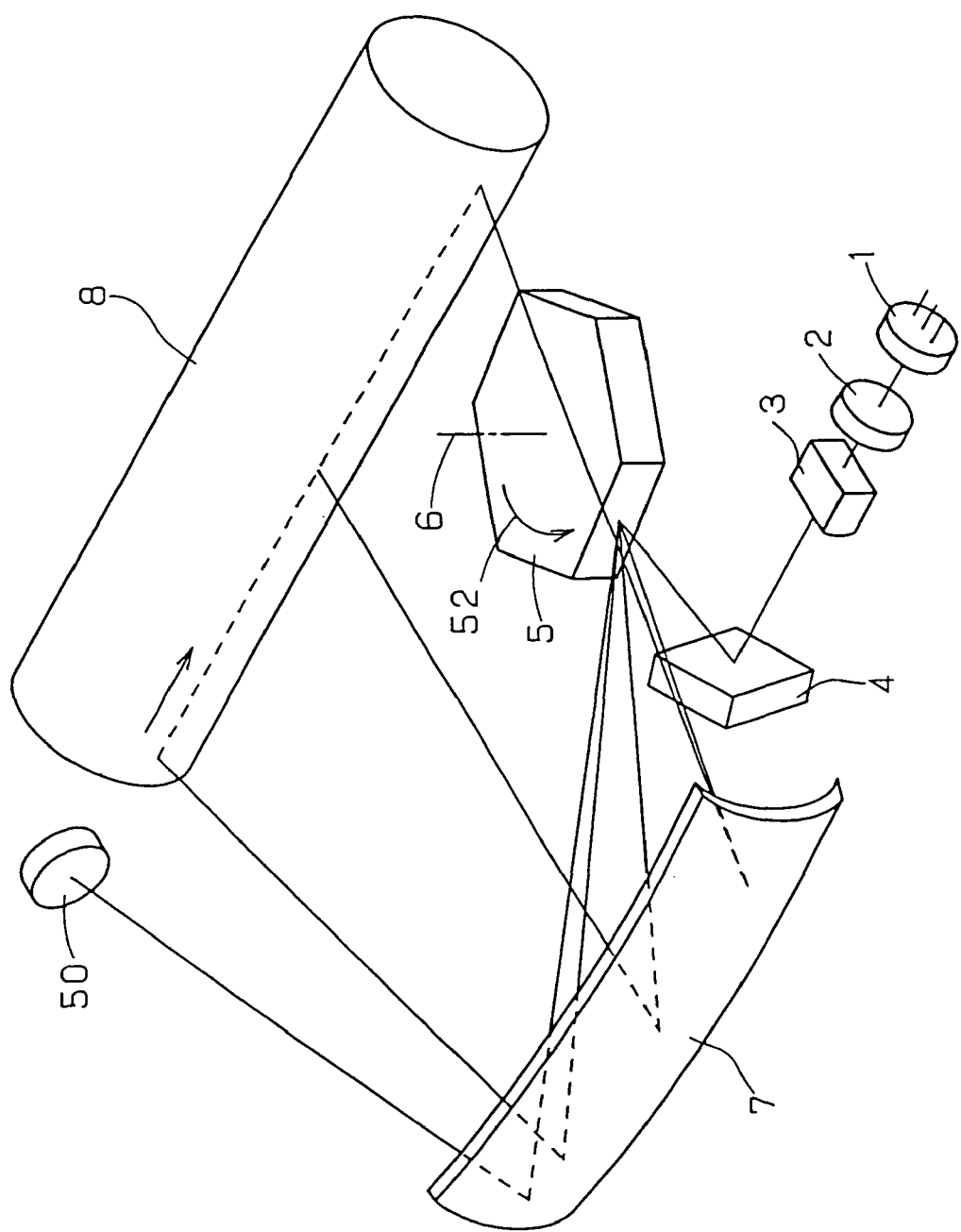
FIG. 1 is a perspective view showing the configuration of a light scanner according to a first embodiment of the present invention.

FIG. 1 is a perspective view showing the configuration of a light scanner according to a first embodiment of the present invention.

In FIG. 1, reference numeral 1 is a semiconductor laser used as a light source portion that emits a light beam having a wavelength of 780 nm, 5 is a polygon mirror used as an optical deflector that scans the light beam from the semiconductor laser 1, 2 is an axisymmetric lens for converging the light beam from the semiconductor laser 1 in the main scanning and sub-scanning directions, 3 is a cylindrical lens with refractive power only in the sub-scanning direction that forms a line image on the deflection surface of the polygon mirror 5 by focusing the light beam from the semiconductor laser 1, and 4 is a reflecting mirror. The axisymmetric lens 2, the cylindrical lens 3 and the reflecting mirror 4 constitute a first imaging optical system, which is placed between the semiconductor laser 1 and the polygon mirror 5 and guides the light beam from the semiconductor laser 1 to the deflection surface of the polygon mirror 5. Reference numeral 8 is a photosensitive drum having a surface to be scanned. Reference numeral 7 is a curved mirror that is placed between the polygon mirror 5 and the photosensitive drum 8, functions as a second imaging optical system, and is part of a detecting optical system. The second imaging optical system guides the light beam from the polygon mirror 5 to the photosensitive drum 8. As described above, the second imaging optical system and the detecting optical system are composed of the same curved mirror 7, thereby eliminating the influence of aberration due to the wavelength of the light source. Reference numeral 6 is a central axis of rotation of the polygon mirror 5, and 50 is a photodiode that serves as a scanning start signal detector for detecting the light beam scanned by the polygon mirror 5.

Figure 2:
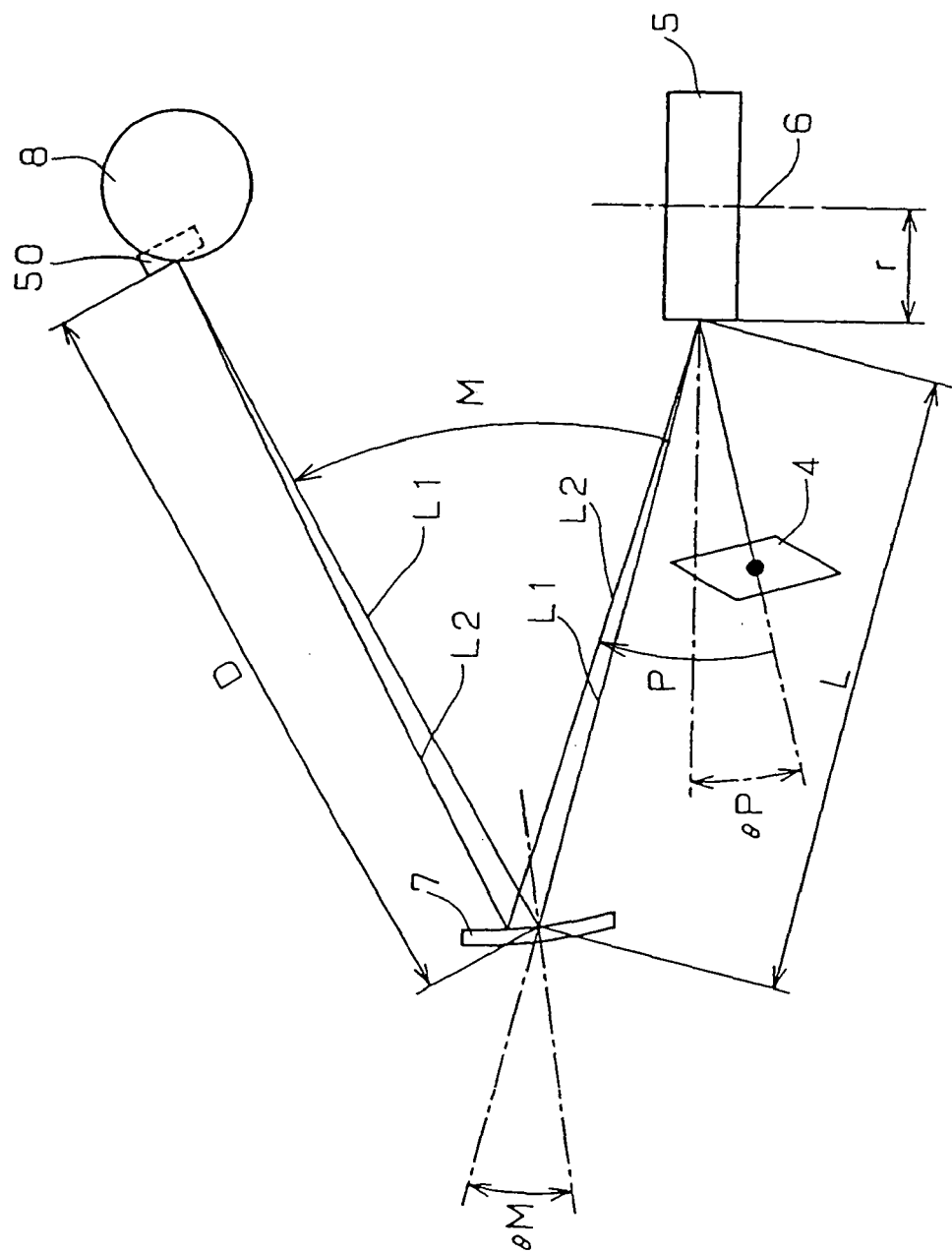
FIG. 2 is a cross sectional view of the light scanner in FIG. 1, taken along a plane that contains the central axis of scanning and is parallel to the sub-scanning direction (i.e., a cross section in the sub-scanning direction).
Figure 3:
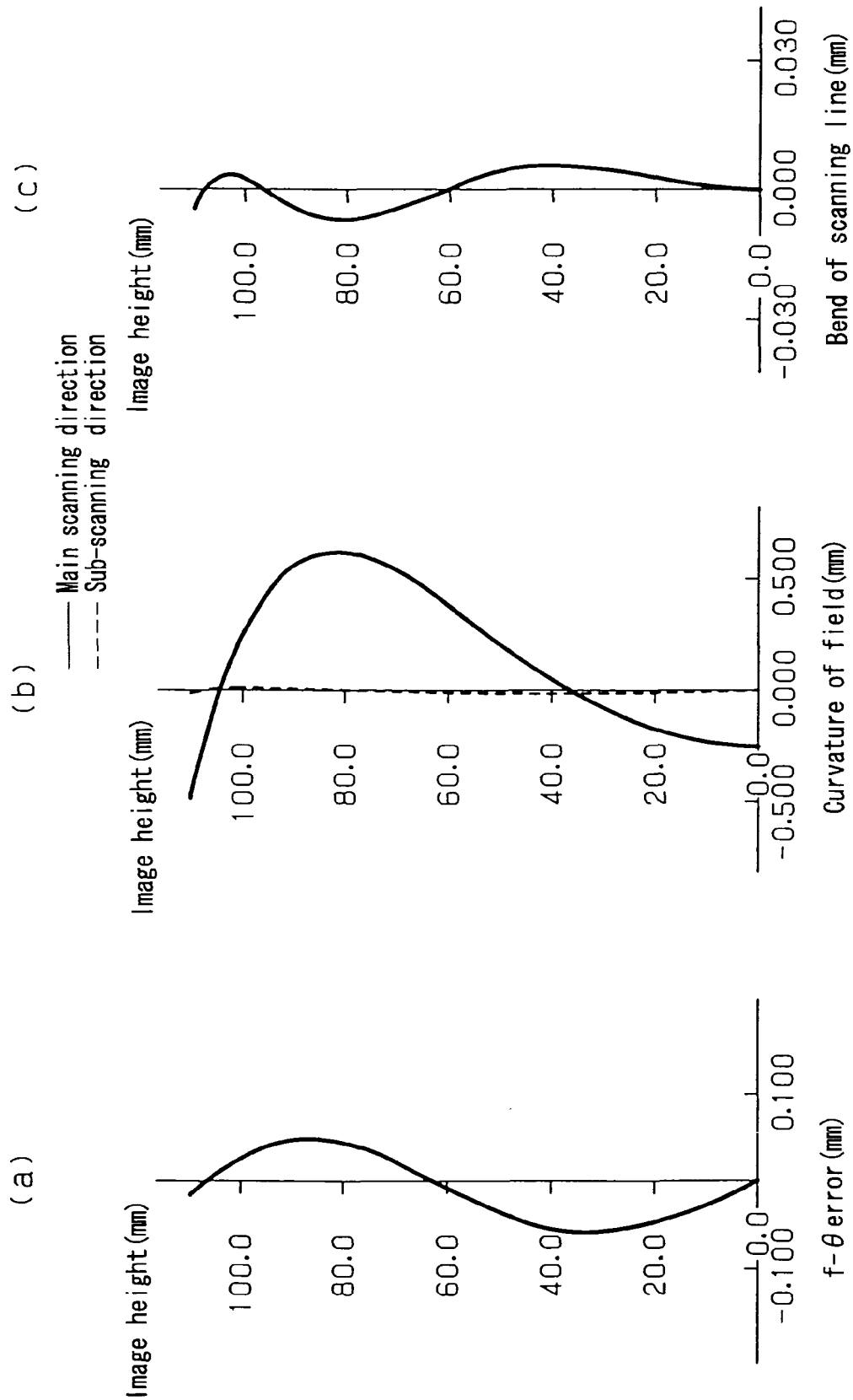
FIG. 3 is a characteristic diagram of the numerical example 1 according to the first embodiment of the present invention: (a) indicates an f-θ error, (b) indicates a field of curvature, and (c) indicates the residual bend of a scanning line.
Figure 4:
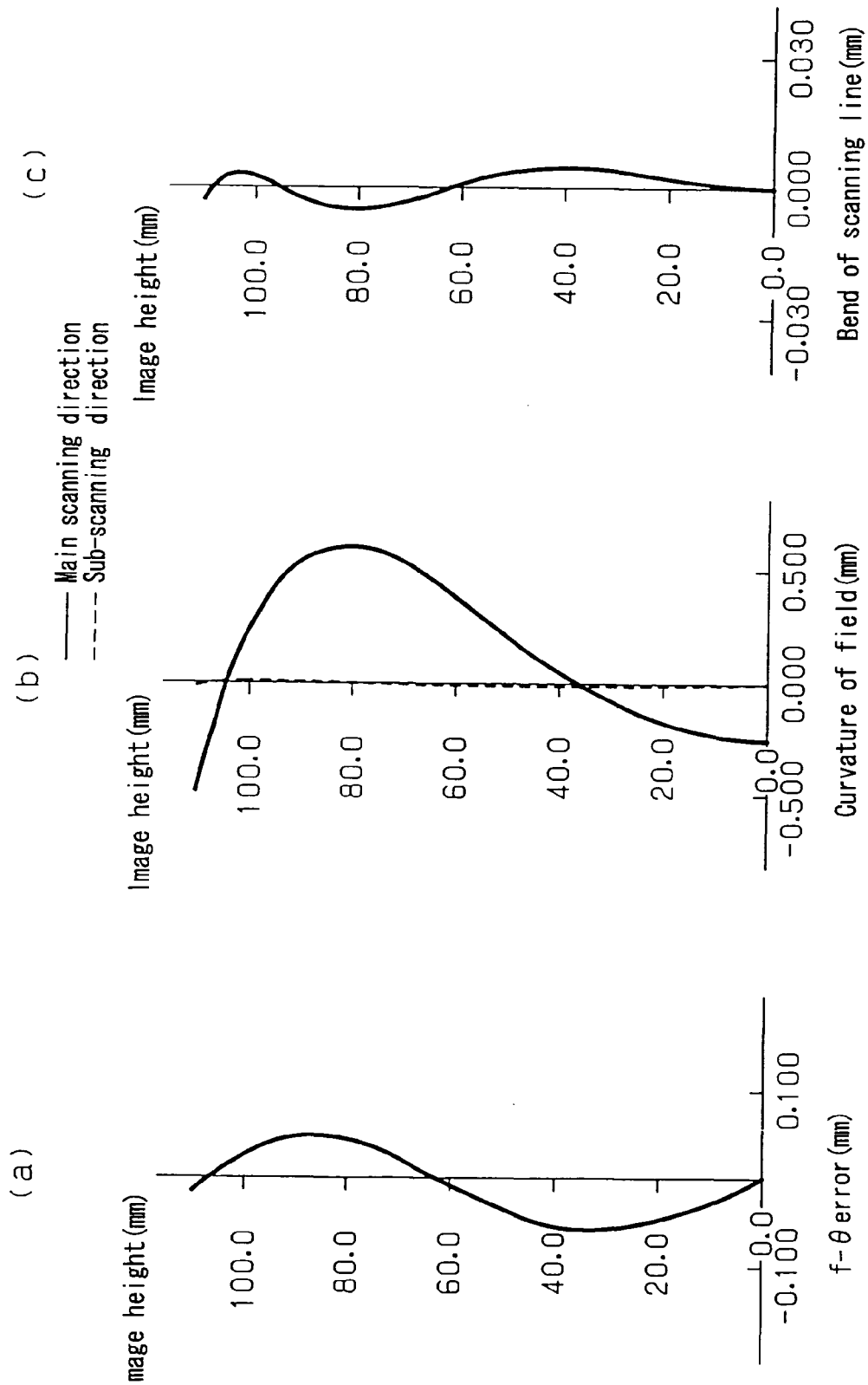
FIG. 4 is a characteristic diagram of the numerical example 2 according to the first embodiment of the present invention: (a) indicates an f-θ error, (b) indicates a field of curvature, and (c) indicates the residual bend of a scanning line.
Figure 5:
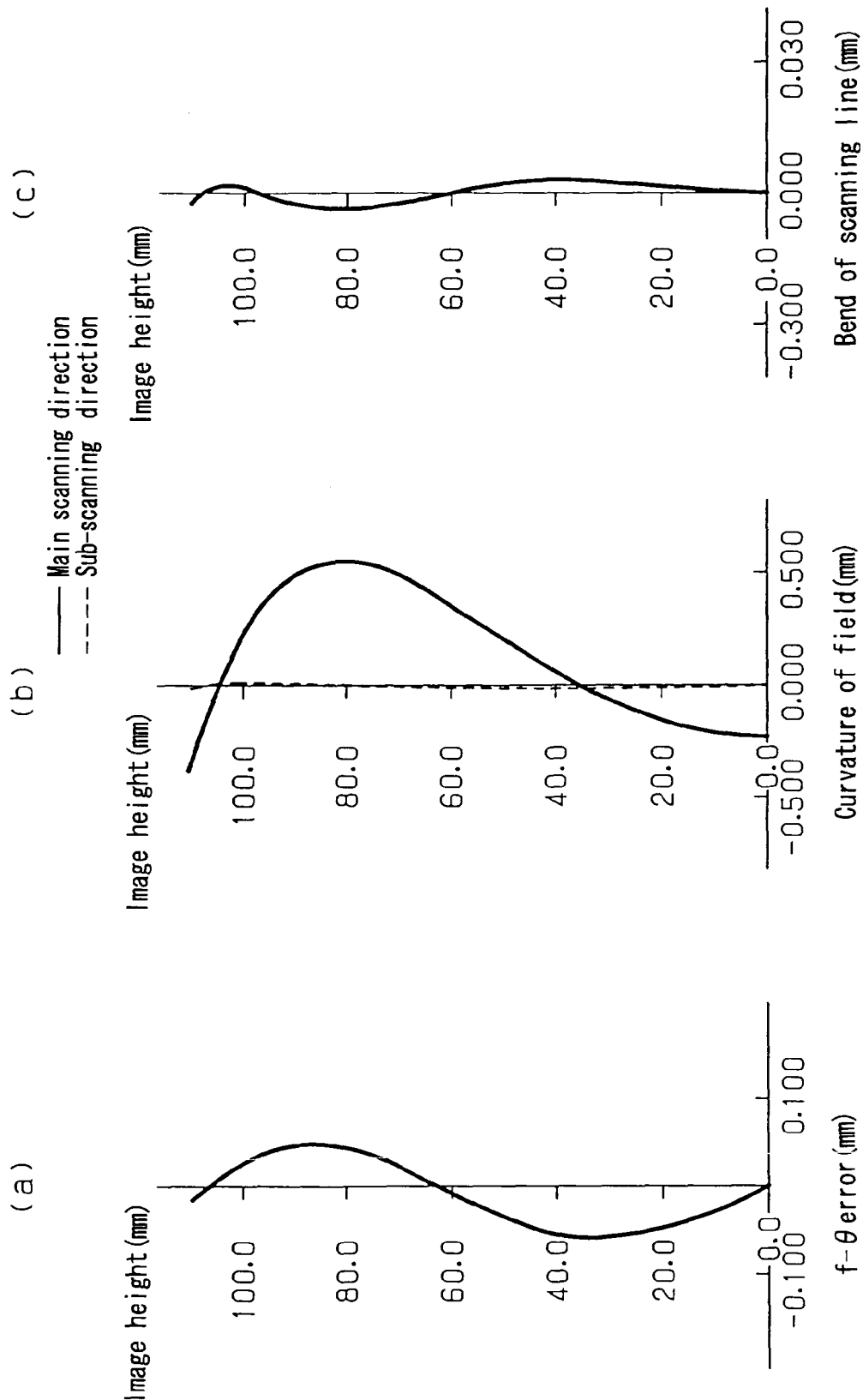
FIG. 5 is a characteristic diagram of the numerical example 3 according to the first embodiment of the present invention: (a) indicates an f-θ error, (b) indicates a field of curvature, and (c) indicates the residual bend of a scanning line.
Figure 6:
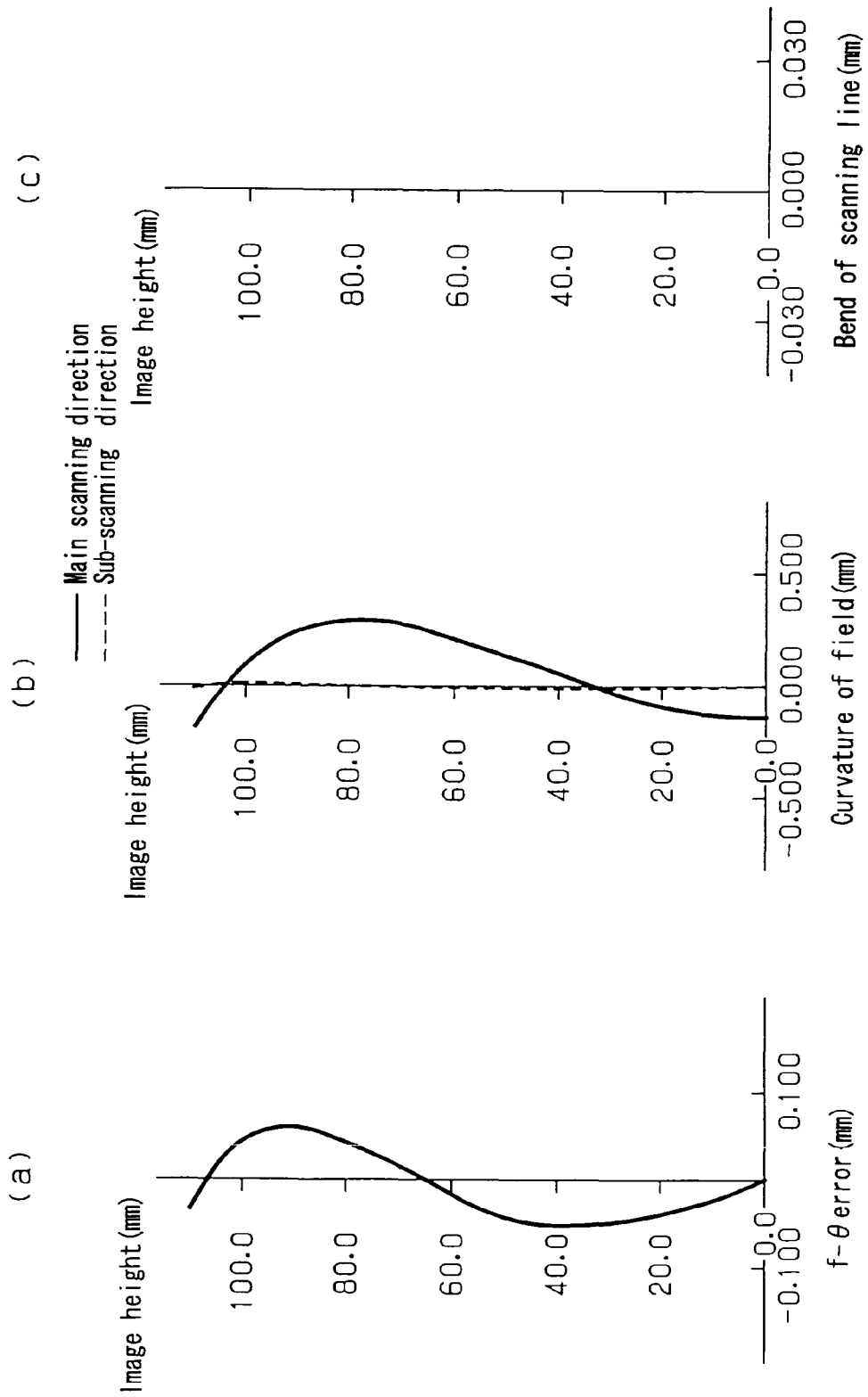
FIG. 6 is a characteristic diagram of the numerical example 4 according to the first embodiment of the present invention: (a) indicates an f-θ error, (b) indicates a field of curvature, and (c) indicates the residual bend of a scanning line.
Figure 7:
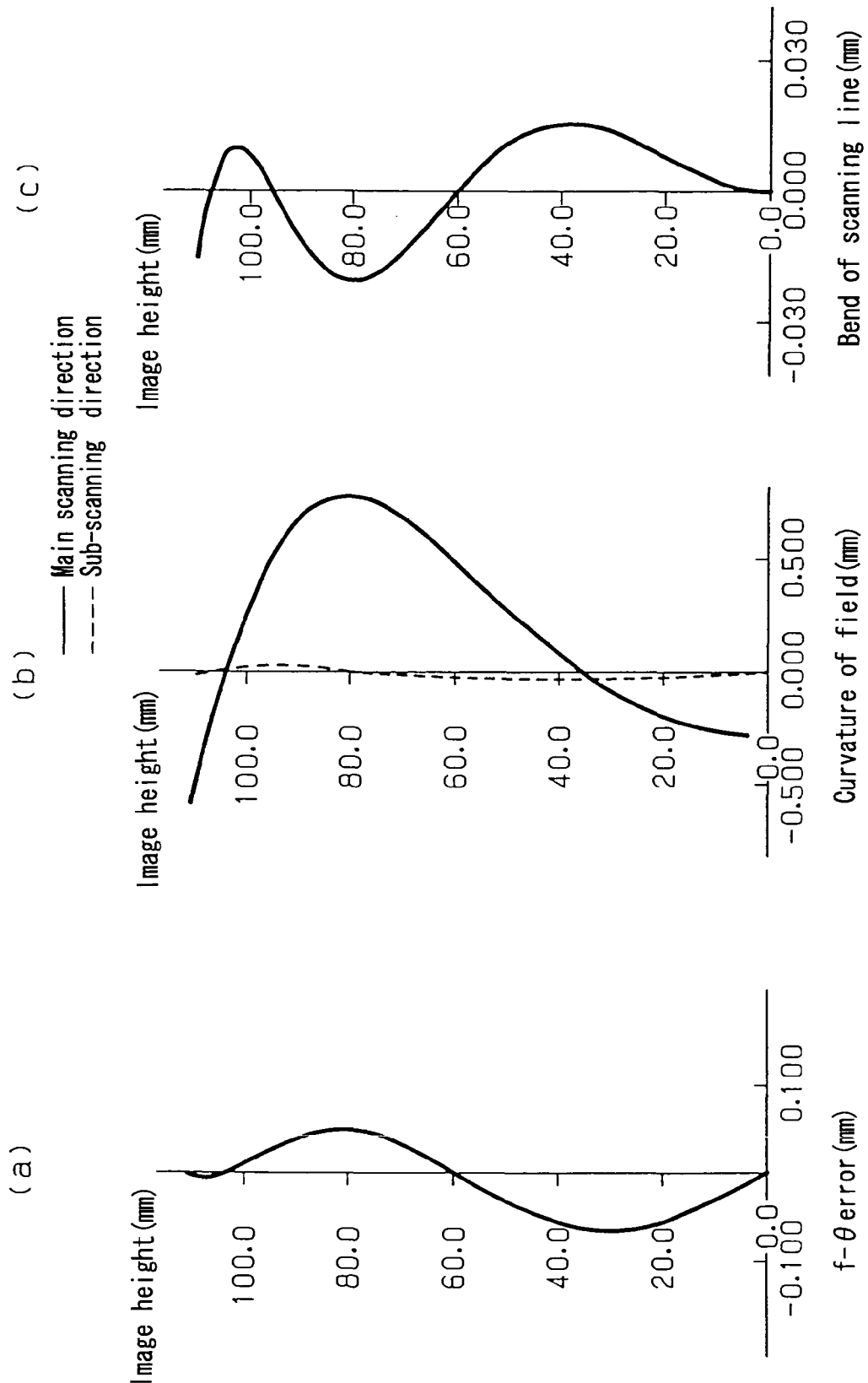
FIG. 7 is a characteristic diagram of the numerical example 5 according to the first embodiment of the present invention: (a) indicates an f-θ error, (b) indicates a field of curvature, and (c) indicates the residual bend of a scanning line.
Figure 8:
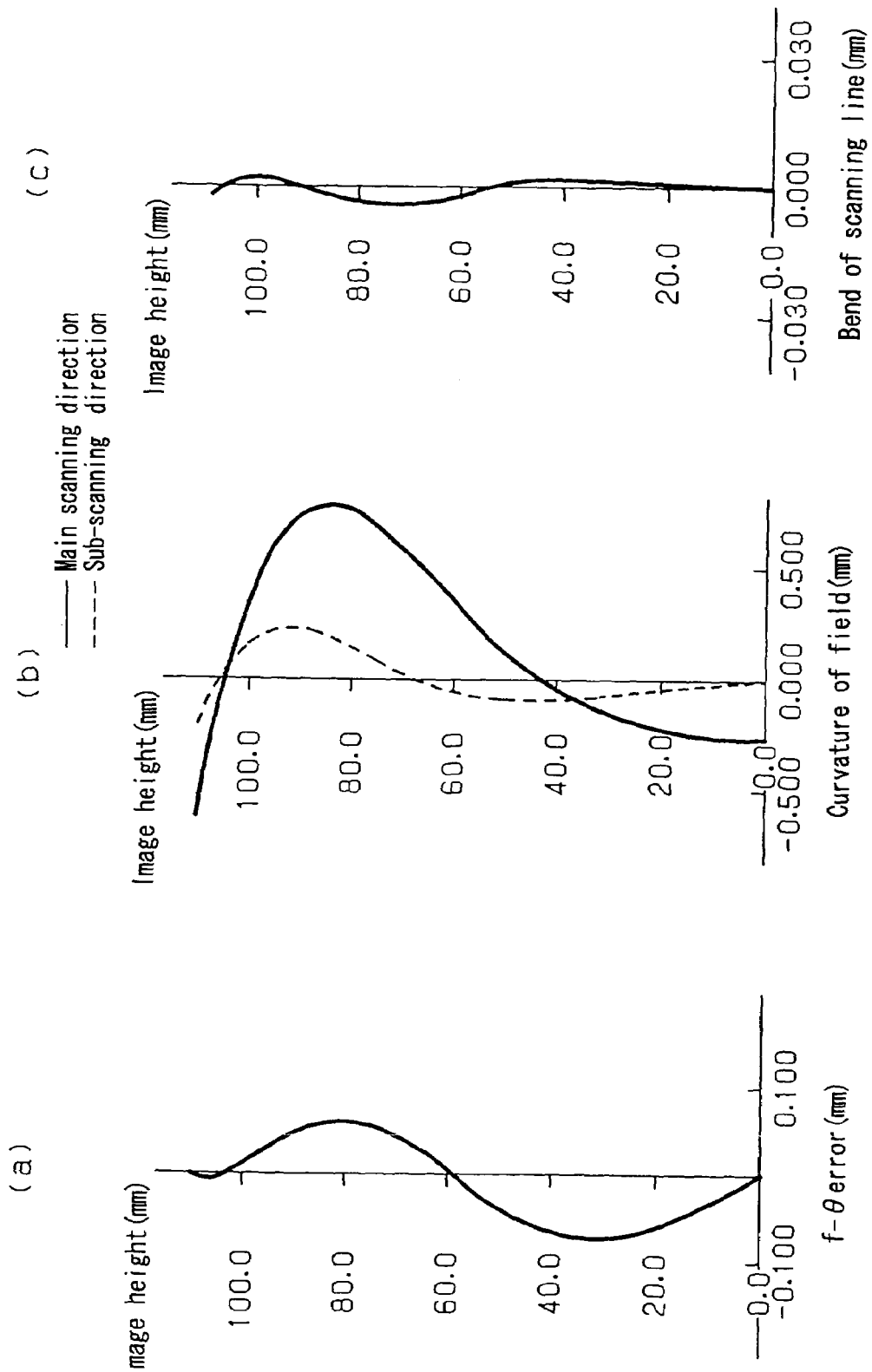
FIG. 8 is a characteristic diagram of the numerical example 6 according to the first embodiment of the present invention: (a) indicates an f-θ error, (b) indicates a field of curvature, and (c) indicates the residual bend of a scanning line.
Figure 9:
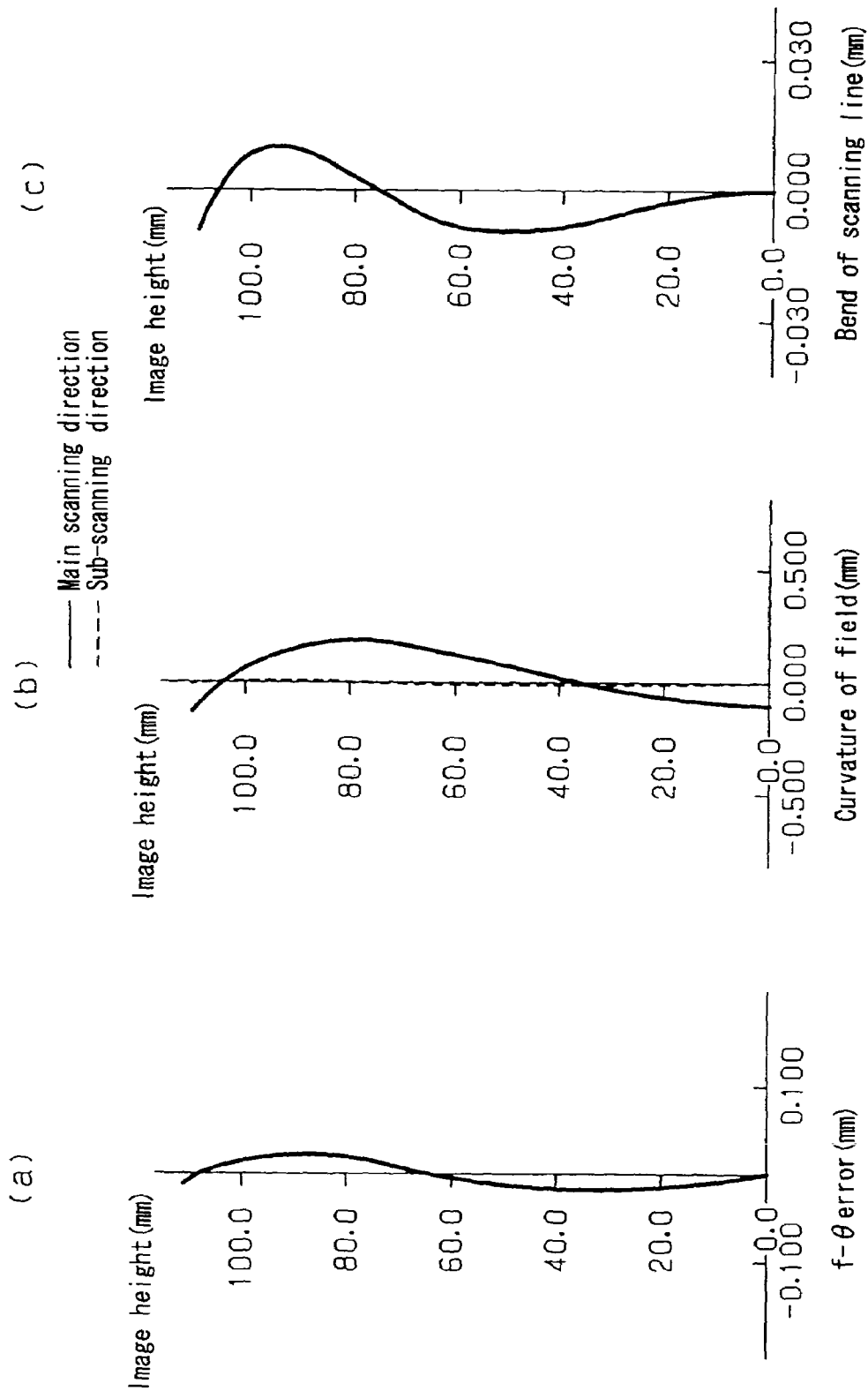
FIG. 9 is a characteristic diagram of the numerical example 7 according to the first embodiment of the present invention: (a) indicates an f-θ error, (b) indicates a field of curvature, and (c) indicates the residual bend of a scanning line.

FIG. 2 is a cross sectional view of the light scanner in FIG. 1, taken along a plane that contains the central axis of scanning and is parallel to the sub-scanning direction (i.e., a cross section in the sub-scanning direction). As shown in FIG. 2, each member of the light scanner is located at different positions in the sub-scanning direction so that a light beam from the reflecting mirror 4 of the first imaging optical system enters obliquely with respect to a plane containing the normal to the deflection surface of the polygon mirror 5 and being parallel to the main scanning direction, and the light beam from the polygon mirror 5 enters obliquely with respect to a plane containing the normal to the curved mirror 7 at its vertex and being parallel to the main scanning direction (i.e., a Y-Z plane). In the cross section taken along the sub-scanning direction, when the direction in which a reflected light beam from the deflection surface of the polygon mirror 5 tilts from an incident light beam from the first imaging optical system is positive, the direction in which a reflected light beam from the curved mirror 7 tilts from an incident light beam from the deflection surface is negative. In other words, the direction of P is opposite to that of M as indicated by the arrows in FIG. 2, where P is the angle formed by a reflected light beam from the deflection surface of the polygon mirror 5 and an incident light beam from the first imaging optical system and M is the angle formed by a reflected light beam from the curved mirror 7 and an incident light beam from the deflection surface. This configuration allows the reflected and incident light beams to be defined as the positive and negative directions, respectively. Thus, aberration caused by the oblique incidence of a light beam can be corrected to provide a favorable spot.

In FIG. 2, r is an in radius of the polygon mirror 5, L is the distance between the deflection surface of the polygon mirror 5 and the vertex of the curved mirror 7, D is the distance between the vertex of the curved mirror 7 and the photosensitive drum 8, θP is the angle between the optical axis of the light beam from the reflecting mirror 4 and the normal to the deflection surface of the polygon mirror 5, and θM is the angle between the optical axis of the light beam from the deflection surface of the polygon mirror 5 and the normal to the curved mirror 7 at its vertex (i.e., the angle formed by the optical axis of the light beam traveling to the curved mirror 7 and the Y-Z plane).

Here, θM satisfies the relationship expressed by 10<θM<35. This means that the curved mirror 7 reflects the light beam at an angle large enough to satisfy 10<θM. Therefore, the degree of freedom in the arrangement of the curved mirror 7 and the polygon mirror 5 with respect to the photosensitive drum (i.e., the surface to be scanned) 8 is increased, so that the light beam from the curved mirror 7 can be guided directly to the photosensitive drum 8 and the photodiode 50 without using a reflecting mirror. In this case, θM<35 shows the range over which aberration can be corrected. Since the detecting optical system is composed of the curved mirror 7 alone, the dependence on the wavelength of the light source is eliminated. Thus, it is possible to vary the wavelength of the light source easily in accordance with particular applications. Moreover, since the transmission loss is reduced even with a so-called short-wavelength light source, the power of the light source can be utilized effectively.

To correct the curvature of field in the main scanning and the sub-scanning direction and an f-θ error, the curved mirror 7 has a noncircular cross section in the main scanning direction and a predetermined radius of curvature in the sub-scanning direction that corresponds to each image height. Further, to correct the bend of a scanning line caused by the oblique incidence of a light beam on the polygon mirror 5, the curved mirror 7 has a predetermined amount of twist of the surface at the position corresponding to each image height.

It is desirable that the curved mirror 7 has an arc-shaped cross section in the sub-scanning direction.

It is desirable that the curved mirror 7 has a shape that is asymmetrical with respect to the Y-Z plane.

It is desirable that the curved mirror 7 is twisted so that the normal at each point, except the vertex, on the generatrix is not contained in the Y-Z plane, the generatrix being a curved line intersecting with the Y-Z plane.

By forming the curved mirror 7 as described above, the optical system can be simplified and the bend of a scanning line can be corrected while correcting the aberration resulting from the oblique incidence of a light beam.

In the desired configuration of the curved mirror 7, it is more desirable that the angle formed by the normal at each point on the generatrix and the Y-Z plane becomes larger as the distance between the vertex and each point increases.

It is more desirable that the direction in which the normal at each point on the generatrix tilts from the Y-Z plane is positive when the direction in which a reflected light beam from the curved mirror 7 tilts from an incident light beam from the deflection surface of the polygon mirror 5 is positive.

It is desirable that the curved mirror 7 is an anamorphic mirror whose radius of curvature at its vertex is different in the main scanning direction and in the sub-scanning direction.

It is desirable that the curved mirror 7 has concave mirror surfaces in the main scanning direction and in the sub-scanning direction.

It is desirable that the curved mirror 7 has a mirror surface whose refractive power in the sub-scanning direction is different in the center and the periphery of the main scanning direction.

It is desirable that the curved mirror 7 is shaped so that a radius of curvature of the cross section in the sub-scanning direction is not affected by the shape of the cross section in the main scanning direction.

The surface shape of the curved mirror 7 having the above configuration is defined by $$Z = f(y) + \frac{\frac{x^2}{g(y)} - 2x \cdot \sin\{\theta(y)\}}{\cos\{\theta(y)\} + \sqrt{\cos^2\{\theta(y)\} - \left(\frac{x}{g(y)}\right)^2 + \frac{2x \cdot \sin\{\theta(y)\}}{g(y)}}} \quad \text{Eq. 10}$$

$$f(y) = \frac{\left(\frac{y^2}{RDy}\right)}{1 + \sqrt{1 - (1+k)\left(\frac{y}{RDy}\right)^2}} + ADy^4 + AEy^6 + AF_y^8 + AGy^{10} \quad \text{Eq. 11}$$

$$g(y) = RDx(1 + BCy^2 + BDy^4 + BEy^6 + BFy^8 + BGy^{10}) \quad \text{Eq. 12}$$

$$\theta = (y)\ ECy^2 + EDy^4 + EEy^6 \quad \text{Eq. 13}$$

where x (mm) is the coordinate in the sub-scanning direction, y (mm) is the coordinate in the main scanning direction, the origin is the vertex of the surface, and z (mm) is the sag from the vertex at the point with coordinate (x, y). Here, the direction in which an incident light beam travels is designated as positive.

Equation 11 shows the non-arc shape of the generatrix. Equation 12 shows the radius of curvature in the sub-scanning direction (i.e., the x-direction) at the point of y. Equation 13 shows the amount of twist at the point of y. RDy (mm) is the radius of curvature in the main scanning direction at the vertex and RDx (mm) is the radius of curvature in the sub-scanning direction. K is a conic constant that represents the shape of the generatrix. AD, AE, AF and AG are higher-order constants that represent the shape of the generatrix. BC, BD, BE, BF and BG are constants that determine the radius of curvature in the sub-scanning direction at the point of y. EC, ED and EE are torsional constants that determine the amount of twist at the point of y.

Tables 1 to 7 show specific numerical examples 1 to 7, respectively. In each table, a maximum image height is represented by Yma and the angle of rotation of the polygon mirror that corresponds to the maximum image height is represented by α max.

Numerical Example 1

TABLE 1

| | | | | | | | | | |
|---|---|---|---|---|---|---|---|---|---|
| Ymax | | 110 | | αmax | | 23.171 | | | |
| θP | | 10 | | θM | | 15 | | | |
| L | | 120.0 | | D | | 57.51 | | r | 17.32 |
| RDy | −334.92 | K | 0.00000e−00 | AD | −3.62302e−09 | AE | −2.73024e−13 | AF | 0.00000e−00 | AG | 0.00000e−00 |
| RDs | −80.52 | BC | −2.89732e−05 | BD | −4.28918e−11 | BE | 0.00000e−00 | BF | 0.00000e−00 | BG | 0.00000e−00 |
| | | EC | −5.82583e−06 | ED | −1.13810e−10 | EE | −1.19931e−14 | | | | |

Numerical Example 2

TABLE 2

| | | | | | | | | | |
|---|---|---|---|---|---|---|---|---|---|
| Ymax | | 110 | | αmax | | 23.171 | | | |
| θP | | 12 | | θM | | 15 | | | |
| L | | 120.0 | | D | | 59.83 | | r | 17.32 |
| RDy | −336.80 | K | 0.00000e−00 | AD | −3.49531e−09 | AE | −2.57312e−13 | AF | 0.00000e−00 | AG | 0.00000e−00 |
| RDs | −82.69 | BC | −2.82629e−05 | BD | −3.28026e−11 | BE | 0.00000e−00 | BF | 0.00000e−00 | BG | 0.00000e−00 |
| | | EC | −5.60722e−06 | ED | −1.15858e−10 | EE | −1.03247e−14 | | | | |

Numerical Example 3

TABLE 3

| | | | | | | | | | |
|---|---|---|---|---|---|---|---|---|---|
| Ymax | | 110 | | αmax | | 23.171 | | | |
| θP | | 15 | | θM | | 15 | | | |
| L | | 120.0 | | D | | 63.66 | | r | 17.32 |
| RDy | −341.34 | K | 0.00000e−00 | AD | −3.24365e−09 | AE | −2.24859e−13 | AF | 0.00000e−00 | AG | 0.00000e−00 |
| RDs | −86.15 | BC | −2.70059e−05 | BD | −1.46493e−11 | BE | 0.00000e−00 | BF | 0.00000e−00 | BG | 0.00000e−00 |
| | | EC | −5.26775e−06 | ED | −1.17342e−10 | EE | −8.03818e−15 | | | | |

Numerical Example 4

TABLE 4

| | | | | | | | | | |
|---|---|---|---|---|---|---|---|---|---|
| Ymax | | 110 | | αmax | | 23.171 | | | |
| θP | | 10.6 | | θM | | 15 | | | |
| L | | 100.0 | | D | | 104.63 | | r | 17.32 |
| RDy | −303.46 | K | 0.00000e−00 | AD | 1.80096e−09 | AE | −1.24638e−13 | AF | 0.00000e−00 | AG | 0.00000e−00 |
| RDs | −105.92 | BC | −1.91645e−05 | BD | 9.15253e−11 | BE | 0.00000e−00 | BF | 0.00000e−00 | BG | 0.00000e−00 |
| | | EC | −5.30805e−06 | ED | −7.70761e−11 | EE | −1.93654e−15 | | | | |

Numerical Example 5

TABLE 5

| | | | | | | | | | |
|---|---|---|---|---|---|---|---|---|---|
| Ymax | | 110 | | αmax | | 23.171 | | | |
| θP | | 8.6 | | θM | | 10 | | | |
| L | | 125.0 | | D | | 42.51 | | r | 17.32 |
| RDy | −344.03 | K | 0.00000e−00 | AD | −4.60135e−09 | AE | −4.72521e−13 | AF | 0.00000e−00 | AG | 0.00000e−00 |
| RDs | −64.44 | BC | −3.67525e−05 | BD | −2.00372e−10 | BE | 0.00000e−00 | BF | 0.00000e−00 | BG | 0.00000e−00 |
| | | EC | −4.70394e−06 | ED | −1.02999e−11 | EE | −2.59942e−14 | | | | |

Numerical Example 6

TABLE 6

| | Ymax | 110 | | αmax | 23.171 | | | | |
|---|---|---|---|---|---|---|---|---|---|
| | θP | 24.8 | | θM | 30 | | | | |
| | L | 130.0 | | D | 57.85 | | r | 17.32 | |
| RDy | −337.35 | K | 0.00000e−00 | AD | −6.04413e−09 | AE | −7.15054e−13 | AF | 0.00000e−00 | AG | 0.00000e−00 |
| RDs | −92.49 | BC | −3.34619e−05 | BD | −3.90448e−10 | BE | 3.46428e−14 | BF | 0.00000e−00 | BG | 0.00000e−00 |
| | | EC | −1.06790e−05 | ED | −3.11321e−10 | EE | −2.48477e−14 | | | |

Numerical Example 7

TABLE 7

| | Ymax | 110 | | αmax | 17.484 | | | | |
|---|---|---|---|---|---|---|---|---|---|
| | θP | 12 | | θM | 15 | | | | |
| | L | 164.0 | | D | 75.27 | | r | 20.0 | |
| RDy | −432.18 | K | 0.00000e−00 | AD | −2.05312e−09 | AE | −6.01611e−14 | AF | 0.00000e−00 | AG | 0.00000e−00 |
| RDs | −106.80 | BC | −1.71971e−05 | BD | −1.09012e−11 | BE | 0.00000e−00 | BF | 0.00000e−00 | BG | 0.00000e−00 |
| | | EC | −3.19258e−06 | ED | −7.70809e−11 | EE | 0.00000e−00 | | | |

In FIG. 2, L1 is a light beam in the cross section taken along the sub-scanning direction and L2 is a light beam deflected in the predetermined direction slightly outside the light beam that scans the photosensitive drum (i.e., the surface to be scanned) 8. The curved mirror 7 forms an image on the extension line of a line to be scanned by focusing the light beam L2, where the photodiode 50 is located. Here, the imaging position of the light beam L2 and that of the light beam L1 are arranged on the same line, and thus the photodiode 50 receives the light beam substantially equal to that scanning the photosensitive drum 8.

The operation of the light scanner with the above configuration will be described by referring to FIGS. 1 and 2.

A light beam having a wavelength of 780 nm from the semiconductor laser 1 is converged in the main scanning and sub-scanning directions by the axisymmetric lens 2. The light beam through the axisymmetric lens 2 passes through the cylindrical lens 3. Since the cylindrical lens 3 has refractive power only in the sub-scanning direction, the light beam from the semiconductor laser 1 is converged only in the sub-scanning direction. Then, the light beam through the cylindrical lens 3 is reflected from the reflecting mirror 4 and focused on the deflection surface of the polygon mirror 5 to form a line image. The polygon mirror 5 scans the light beam that has been focused as a line image while rotating around the central axis 6 in the direction of the arrow 52, and the curved mirror 7 converges the light beam into convergent light to form an image on the photosensitive drum (i.e., the surface to be scanned) 8.

The light beam L2 deflected in the predetermined direction slightly outside the light beam that scans the photosensitive drum (i.e., the surface to be scanned) 8 is focused by the curved mirror 7 on the photodiode 50 to form an image.

A control device (not shown) controls the semiconductor laser 1 using a detection signal from the photodiode 50 as a synchronizing signal.

Table 8 shows wavefront aberrations for a scanning center and a maximum image height in each of the numerical examples 1 to 7.

TABLE 8

| | | Numerical examples | | | | | | |
|---|---|---|---|---|---|---|---|---|
| | | 1 | 2 | 3 | 4 | 5 | 6 | 7 |
| θM/θP + 0.98L/(L + D) | | 2.163 | 1.904 | 1.640 | 1.894 | 1.894 | 1.888 | 1.922 |
| Wavefront aberration (mλ) | Scanning center | 2 | 2 | 2 | 5 | 4 | 5 | 2 |
| | Maximum image height | 54 | 7 | 68 | 16 | 11 | 12 | 6 |

The numerical examples 1 to 3 are design examples where θP is varied under the conditions of L=120 and θM=15. In this case, the numerical example 2 is the optimum design example that can correct aberration caused by the oblique incidence of a light beam on the polygon mirror 5. The numerical examples 1 and 3 are the design examples having values respectively close to the upper and the lower limit of a range defined by $$1.6 < \theta M/\theta P + 0.98L/(L+D) < 2.2. \quad \text{Eq. 14}$$

The numerical examples 4 to 7 are design examples where an optimum θP is determined for each L and θM. These numerical examples satisfy the conditional equation given by $$1.86 < \theta M/\theta P + 0.98L/(L+D) < 1.94. \quad \text{Eq. 15}$$

Table 9 shows the ratio of beam diameter in the sub-scanning direction (with an intensity of $1/e^2$) for a scanning center and a maximum image height in each of the numerical examples 1 to 7.

TABLE 9

| | Numerical examples | | | | | | |
|---|---|---|---|---|---|---|---|
| | 1 | 2 | 3 | 4 | 5 | 6 | 7 |
| L/(L + D) | 0.68 | 0.67 | 0.65 | 0.49 | 0.75 | 0.69 | 0.69 |
| Ratio of beam diameter in the sub-scanning direction | 0.65 | 0.62 | 0.78 | 0.72 | 0.45 | 0.54 | 0.72 |

Each of the numerical examples satisfies the relationship expressed by $$0.48 < L/(L+D) < 0.75. \qquad \text{Eq. 16}$$

FIGS. 3 to 9 are characteristic diagrams of the numerical examples 1 to 7, respectively. In each figure, (a) to (c) show the characteristics of a light beam having a wavelength of 780 nm: (a) indicates an f-θ error, (b) indicates a field of curvature, and (c) indicates the residual bend of a scanning line. As can be seen from FIGS. 3 to 9, the f-θ error, the field of curvature and the bend of a scanning line are well corrected by using the curved mirror 7 as the second imaging optical system.

The f-θ error (ΔY) is the amount expressed by $$\Delta Y = Y - V \times \alpha \qquad \text{Eq. 17}$$

where V (mm/deg) is a scanning rate per unit angle of rotation of the polygon mirror 5 in the vicinity of the scanning center (i.e., the rate at which a light beam scans the surface of the photosensitive drum 8), α (deg) is the angle of rotation of the polygon mirror 5, and Y (mm) is an image height.

As described above, this embodiment allows the second imaging optical system and the detecting optical system to be composed of the curved mirror 7 alone, so that a light beam from the curved mirror 7 can be guided directly to the photosensitive drum 8 and the photodiode 50. In other words, this embodiment can guide the light beam from the curved mirror 7 directly to the photosensitive drum 8 and the photodiode 50 without placing a reflecting mirror or lens between the curved mirror 7 and the photosensitive drum 8 as well as the curved mirror 7 and the photodiode 50. Moreover, the curved mirror 7 has a shape that is relatively easy to process and measure, thereby providing the light scanner having favorable optical performance and no wavelength dependence.

It is desirable that the light source portion includes a wavelength-variable light source and a wavelength control portion. This is because the size of a spot formed on the photosensitive drum 8 can be controlled arbitrarily by using a wavelength-variable laser as the semiconductor laser 1 and controlling its wavelength.

In this embodiment, the surface shape of the curved mirror 7 is defined by Equations 10 to 13. However, other equations may be used, as long as they can express the same shape.

Figure 11:
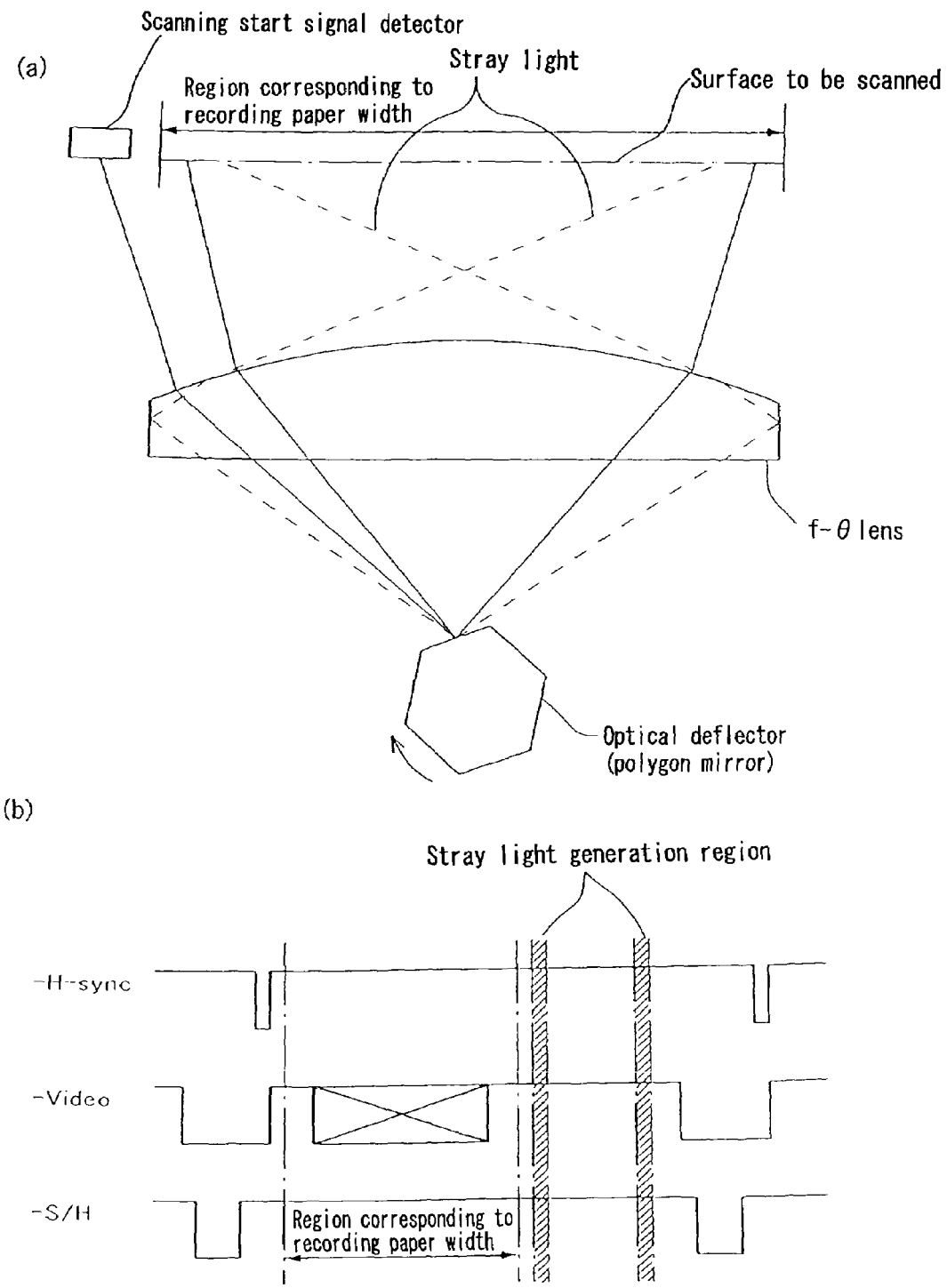
FIG. 11 is a schematic view (a comparative example) illustrating the disadvantage of an f-θ lens to be used as the second imaging optical system and the detecting optical system according to the first embodiment of the present invention.

For a conventional light scanner, an f-θ lens is used as the second imaging optical system and the detecting optical system, and a light beam scanned by the optical deflector (i.e., a polygon mirror) is guided to the surface to be scanned and the scanning start signal detector through the f-θ lens. As shown in FIG. 11(a), a light beam that is scanned by the optical deflector (i.e., the polygon mirror) and passes through the ends of the f-θ lens becomes stray light. Thus, it is necessary to generate a control signal (−S/H) for automatic power control (i.e., APC) operation and a control signal (−Video) for turning on the semiconductor laser to perform that operation in such timing that the signals avoid the stray light generation region, as shown in FIGS. 11(a) and 11(b). This always has to be taken into consideration in designing a LSU control sequence, which requires a great deal of time. Depending on the rotation speed of the polygon mirror and the effective image region, it may be impossible to take sufficient time to perform the APC operation. Moreover, there is a limit to an increase in the effective image region.

For the light scanner according to the present invention, the curved mirror is used as the second imaging optical system and the detecting optical system, and a light beam scanned by the optical deflector (i.e., the polygon mirror) is reflected from the curved mirror onto the surface to be scanned and the scanning start signal detector. As shown in FIG. 10(a), no stray light is caused by the curved mirror because the reflecting optical system is free from unexpected reflection, such as the reflection inside a lens. Thus, as shown in FIGS. 10(a) and 10(b), the light source can be turned on so as to perform the APC operation at any time during the period between the completion of the present scanning of a printing region followed by transmission of a light beam through a portion of the surface to be scanned that corresponds to the end of a recording paper and the detection of a light beam of the next scanning by the scanning start signal detector. Therefore, the present invention can simplify the APC control sequence and the on-off control sequence of the semiconductor laser. Since there is no region where the semiconductor laser must be turned off, there is sufficient time to perform the APC operation. Moreover, the effective image region (i.e., the image-recordable region on the surface to be scanned) can be broadened.

Second Embodiment

Figure 12:
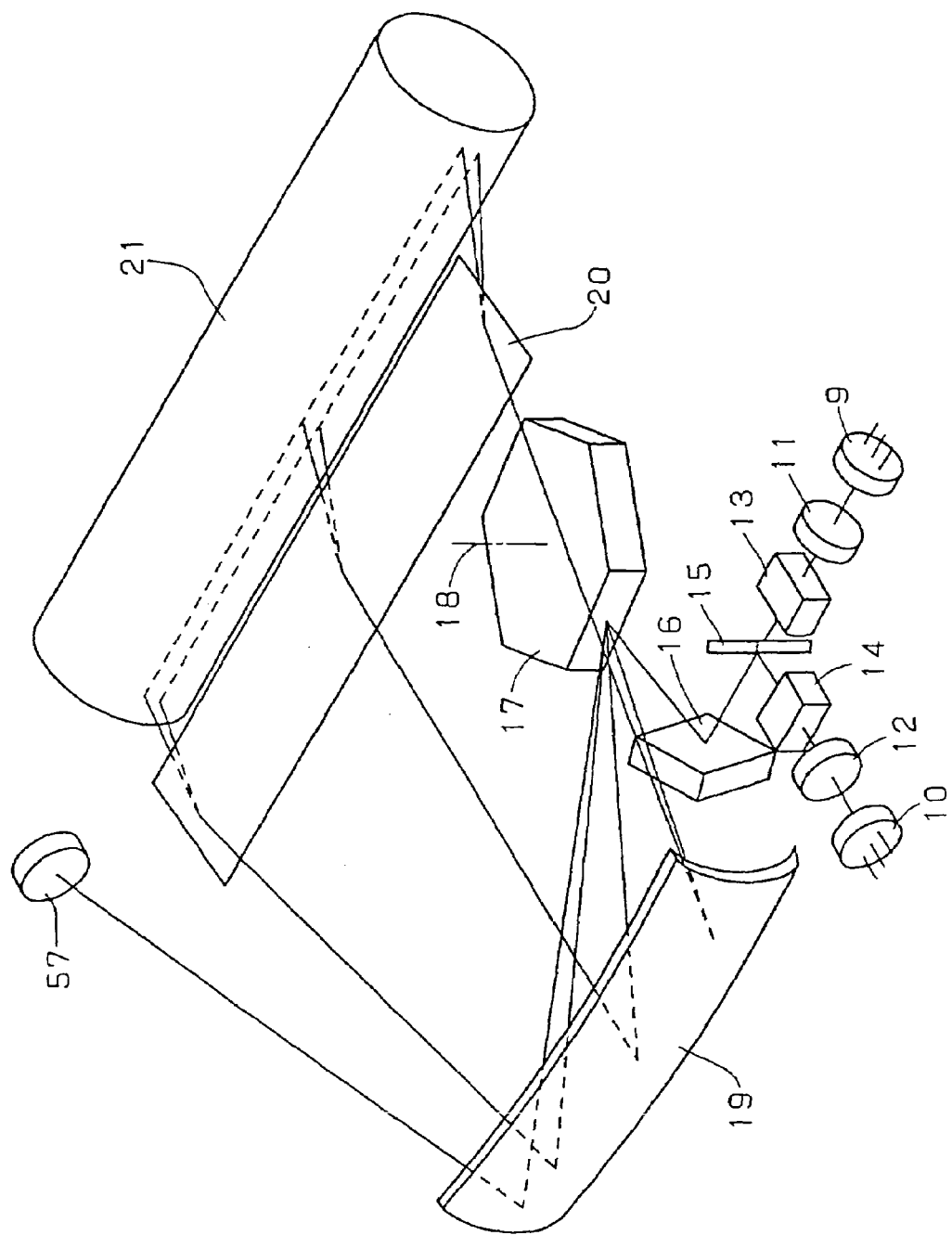
FIG. 12 is a perspective view showing the configuration of a light scanner according to a second embodiment of the present invention.

FIG. 12 is a perspective view showing the configuration of a light scanner according to a second embodiment of the present invention.

In FIG. 12, reference numeral 9 is a first semiconductor laser used as a light source portion that emits a light beam having a wavelength of λ1 (e.g., 780 nm), 10 is a second semiconductor laser that emits a light beam having a wavelength of λ2 (e.g., 650 nm), 17 is a polygon mirror used as an optical deflector that scans the light beams from the first and second semiconductor lasers 9 and 10, 11 is a first axisymmetric lens that converges the light beam from the first semiconductor laser 9 into convergent light, 12 is a second axisymmetric lens that converges the light beam from the second semiconductor laser 10 into convergent light, 13 is a first cylindrical lens with refractive power only in the sub-scanning direction that forms a line image on the deflection surface of the polygon mirror 17 by focusing the light beam from the first semiconductor laser 9, 14 is a second cylindrical lens with refractive power only in the sub-scanning direction that forms a line image on the deflection surface of the polygon mirror 17 by focusing the light beam from the second semiconductor laser 10, 15 is a dichroic mirror used as a light combining means for reflecting the light beam with a wavelength of λ2 while allowing the light beam with a wavelength of λ1 to pass through, and 16 is a reflecting mirror. The first axisymmetric lens 11, the first cylindrical lens 13 and the reflecting mirror 16 constitute a first imaging optical system, which is placed between the first semiconductor laser 9 and the polygon mirror 17 and guides the light beam from the first semiconductor laser 9 to the deflection surface of the polygon mirror 17. Similarly, the second axisymmetric lens 12, the second cylindrical lens 14 and the reflecting mirror 16 constitute a first imaging optical system, which is placed between the second semiconductor laser 10 and the polygon mirror 17 and guides the light beam from the second semiconductor laser 10 to the deflection surface of the polygon mirror 17. Reference numeral 21 is a photosensitive drum having a surface to be scanned. Reference numeral 20 is a diffraction grating that is placed between the polygon mirror 17 and the photosensitive drum 21 and functions as a light separating means for separating light into the light beam having a wavelength of λ1 and that having a wavelength of λ2. Reference numeral 19 is a curved mirror that is placed between the polygon mirror 17 and the diffraction grating 20, functions as a second imaging optical system, and is part of a detecting optical system. The second imaging optical system guides the light beam from the polygon mirror 17 to the photosensitive drum 21. The curved mirror 19 has the same surface shape as that of the curved mirror 7 in the first embodiment. It focuses the light beam deflected in the predetermined direction slightly outside the light beam that scans the photosensitive drum (i.e., the surface to be scanned) 21 on a photodiode 57 to form an image, like the first embodiment. Reference numeral 18 is a central axis of rotation of the polygon mirror 17, and 57 is the photodiode used as a scanning start signal detector for detecting the light beam scanned by the polygon mirror 17.

Other configurations, such as the arrangement and degree of inclination of each member, are the same as those in the first embodiment. Therefore, the explanation will be omitted.

The operation of the light scanner with the above configuration will be described by referring to FIG. 12.

Two light beams having different wavelengths of λ1 and λ2 are combined by the dichroic mirror 15, scanned by the polygon mirror 17, and converged by the curved mirror 19 into convergent light. The convergent light is separated by the diffraction grating 20 into light beams having different wavelengths of λ1 and λ2, which then are focused on the photosensitive drum 21 to form images. Accordingly, two line images can be formed on the photosensitive drum (i.e., the surface to be scanned) 21 at the same time with a single scanning, i.e., two lines can be scanned, making the image formation rate twice as fast. In such a case, the second imaging optical system and the detecting optical system are composed of the same curved mirror (i.e., a reflecting mirror) 19 alone. Therefore, the curved mirror 19 causes no chromatic aberration even when using light of different wavelengths.

As described above, this embodiment allows both light beams separated by the diffraction grating 20 to be focused favorably on the photosensitive drum 21 to form images.

Also, the two light beams traveling to the photodiode 57 are focused favorably, and thus no modification is necessary when either or both of the light beams are used to detect a reference position.

This embodiment employs the dichroic mirror 15 as a light combining means. However, a half mirror may be used instead of the dichroic mirror 15.

This embodiment employs the diffraction grating 20 as a light separating means. However, a dichroic mirror may be used instead of the diffraction grating 20.

This embodiment performs two-line scanning with the light separating means. However, wavelength-multiplexed scanning also can be performed without relying on the light separating means.

In this embodiment, the polygon mirror 17 is used to scan two light beams at the same time. However, scanning with a resolution that corresponds to the wavelength of each light beam may be performed. For example, only the semiconductor laser having a wavelength of 780 nm is used to provide a large beam diameter for recording with low resolution, while only the semiconductor laser having a wavelength of 650 nm is used to provide a small beam diameter for recording with high resolution. In such a case, since the curved mirror 19 causes no chromatic aberration, the light beams of different wavelengths are focused on the photosensitive drum 21 and the photodiode 57 to form images.

In this embodiment, the light beam from the first semiconductor laser 9 and that from the second semiconductor laser 10 are detected by the photodiode 57. However, two photodiodes may be provided so as to detect the light beams from the first and second semiconductor lasers 9 and 10 separately by placing a diffraction grating between the curved mirror 19 and the photodiode 57.

Figure 13:
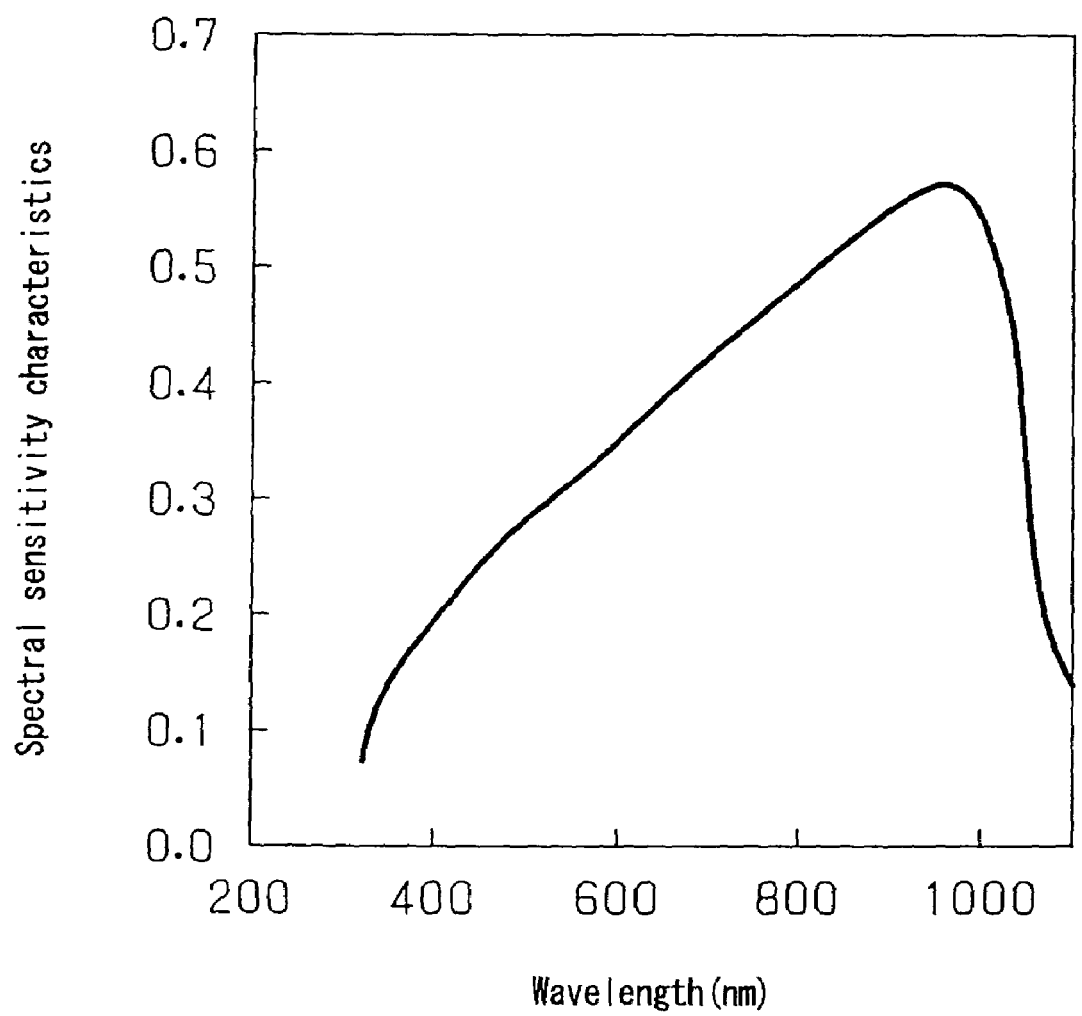
FIG. 13 is a characteristic diagram showing the spectral sensitivity of a typical photodiode.
Figure 14:
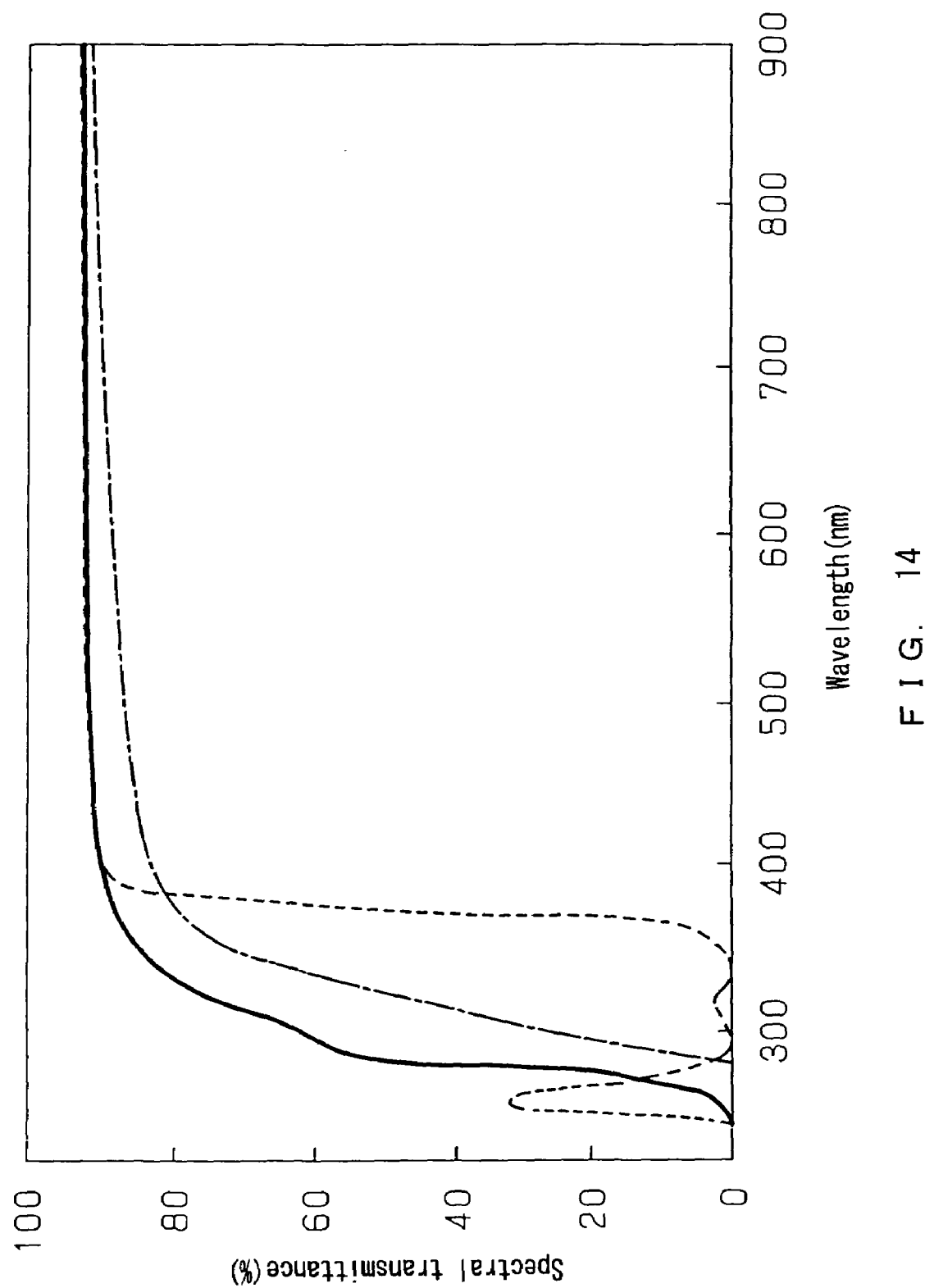
FIG. 14 is a characteristic diagram showing the spectral transmittance of a typical lens material of resin.

The first and second embodiments can employ the light source that emits a light beam having a wavelength of 500 nm or less to provide a light scanner capable of reducing transmission loss and recording with high resolution. FIG. 13 is a characteristic diagram showing the spectral sensitivity of a typical photodiode. FIG. 14 is a characteristic diagram showing the spectral transmittance of a typical lens material of resin. In the wavelength region of 500 nm or less, the spectral sensitivity of the photodiode is about half the spectral sensitivity at a general wavelength of 780 nm. Moreover, the use of a plurality of resin lenses reduces the power of a light beam due to the spectral transmittance of the lenses, which makes it difficult for the photodiode to detect the light beam. However, the light scanner of the present invention uses only a single curved mirror for the detecting optical system, so that the mirror can have a reflectance of 95% or more and a reference signal can be detected easily even with a short-wavelength light source.

Third Embodiment

FIG. 15 is a schematic cross sectional view showing an image forming apparatus according to a third embodiment of the present invention. The image forming apparatus includes the light scanner of the first or the second embodiment.

In FIG. 15, reference numeral 26 is a photosensitive drum having the surface to be scanned that is covered with a photosensitive member whose charge is changed by irradiation of light, 27 is a primary charger that charges the photosensitive drum 26 by applying electrostatic ions to the surface of the photosensitive member, 28 is a developing device that attaches charged toner to a printing portion, 29 is a transfer charger that transfers the attached toner to a paper, 30 is a cleaner that removes remaining toner, 31 is a fixing device that fixes the transferred toner on the paper, 32 is a paper feed cassette, 33 is a light source block including a semiconductor laser used as a light source portion and a first imaging optical system composed of an axisymmetric lens and a cylindrical lens, 34 is a polygon mirror used as an optical deflector, 35 is a curved mirror, and 62 is a photodiode.

As described above, this embodiment employs the light scanner of the first or the second embodiment in an image forming apparatus, thereby providing an image forming apparatus with small size, low cost, high resolution, and high speed.

Fourth Embodiment

Figure 16:
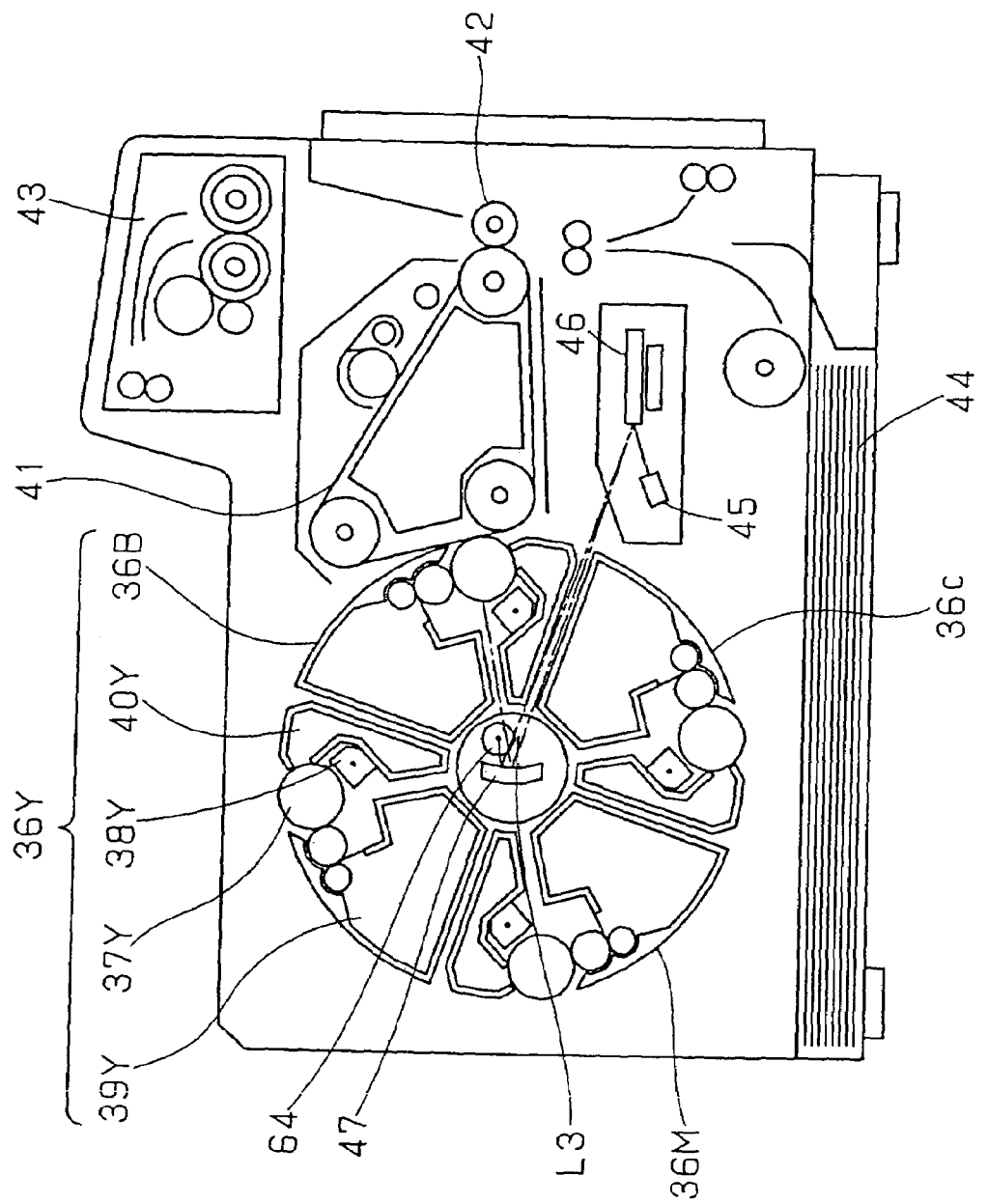
FIG. 16 is a schematic cross sectional view showing a color image forming apparatus according to a fourth embodiment of the present invention.

FIG. 16 is a schematic cross sectional view showing the configuration of a color image forming apparatus according to a fourth embodiment of the present invention. The color image forming apparatus includes the light scanner of the first or the second embodiment.

In FIG. 16, image forming units 36Y, 36M, 36C, and 36B are provided for colors of yellow, magenta, cyan, and black. Each of the image forming units includes a photosensitive drum 37, a primary charger 38, a developing device 39, and a cleaner 40. The photosensitive drum 37 has the surface to be scanned that is covered with a photosensitive member whose charge is changed by irradiation of light. The primary charger 38 charges the photosensitive drum 37 by applying electrostatic ions to the surface of the photosensitive member. The developing device 39 attaches charged toner to a printing portion. The cleaner 40 removes remaining toner. Reference numeral 41 is a transfer belt to which a toner image formed on the photosensitive drum 37 for each color is transferred, 42 is a transfer charger that transfers the toner attached to the transfer belt 41 to a paper, 43 is a fixing device that fixes the transferred toner on the paper, 44 is a paper feed cassette, 45 is a light source block including a semiconductor laser used as a light source portion and a first imaging optical system composed of an axisymmetric lens and a cylindrical lens, 46 is a polygon mirror used as an optical deflector, 47 is a curved mirror, and 64 is a photodiode. The photodiode 64 is located at the position on which a light beam L3 is focused to form an image. The light beam L3 is deflected in the predetermined direction slightly outside the light beam that scans the photosensitive drum 37.

The image forming units 36Y, 36M, 36C, and 36B for four colors are held to form a cylinder. Each of the image forming units is rotated simultaneously around the axis of the cylinder, so that they can move between the image forming position (i.e., the position of the photosensitive drum 37 of the image forming unit 36B shown in FIG. 16) and the waiting positions. This makes it possible to transfer the toner image of each color that is formed on the photosensitive drum 37 successively to the transfer belt 41. Thus, the toner images of four colors are superimposed to compose a color toner image on the transfer belt 41.

The light scanner, including the light source block 45, the polygon mirror 46 and the curved mirror 47, is designed so that the reflection angle of a light beam from the curved mirror 47 is 30 (deg), which is suitable for the color image forming apparatus of this embodiment. Therefore, only the curved mirror 47 is located close to the axis of the cylinder, and the light beam reflected from the curved mirror 47 is guided directly to the photosensitive drum 37.

As described above, this embodiment employs the light scanner of the first or the second embodiment in a color image forming apparatus, thereby providing a color image forming apparatus with small size, low cost, high resolution, and high speed.

In each of the above embodiments, a light beam from the curved mirror is guided directly to the photosensitive drum and the photodiode. However, the present invention is not limited to this configuration. It is also possible to place a reflecting mirror or a lens with a simple shape between the curved mirror and the photodiode.

A reflecting mirror or a lens generally is located close to the photodiode to make some adjustment to the position of the photodiode. A flat reflecting mirror simply reflects a light beam from the curved mirror to the photodiode without causing any change in the light beam. Therefore, when the reflecting mirror is used, the photodiode can receive a light beam that is substantially equal to the light beam traveling from the curved mirror to the photosensitive drum. The light beam reflected from the curved mirror does not deviate much because it is corrected satisfactorily even in the case of an optical face tangle error of the polygon mirror. Therefore, when a lens is placed between the curved mirror and the photodiode, the effective diameter of the lens can be reduced. The light beam reflected from the curved mirror is convergent light in both the main scanning direction and the sub-scanning direction so as to be focused on the photosensitive drum. Accordingly, a simple axisymmetric lens can be used as the lens placed between the curved mirror and the photodiode. In contrast, when a light beam before entering the curved mirror is guided to the photodiode, a lens having a large aperture to deal with the optical face tangle error as well as another reflecting mirror are necessary. Moreover, the optical face tangle error correction also is required to stably detect a light beam by the photodiode. The light beam before entering the curved mirror is substantially parallel light in the main scanning direction and divergent light in the sub-scanning direction. Accordingly, an anamorphic lens is necessary.

The use of a small lens between the curved mirror and the photodiode can make it easier to prevent a light beam that scans in the vicinity of the lens from being reflected in an unexpected direction (being stray light) by supporting the lens with, e.g., a long cylindrical member.

Thus, even if a lens is used for adjustment, the present invention can provide the effects by allowing a light beam guided to the photodiode to be substantially equal to the light beam traveling from the curved mirror to the photosensitive drum.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light scanner comprising:
   a light source portion for emitting a light beam having a predetermined wavelength;
   an optical deflector for scanning the light beam from the light source portion;
   a first imaging optical system placed between the light source portion and the optical deflector for guiding the light beam from the light source portion to a deflection surface of the optical deflector;
   a second imaging optical system of a single curved mirror placed between the optical deflector and a surface to be scanned for guiding the light beam from the optical deflector to the surface to be scanned;
   a scanning start signal detector for detecting the light beam scanned by the optical deflector; and
   a detecting optical system placed between the optical deflector and the scanning start signal detector for guiding the light beam scanned by the optical deflector to the scanning start signal detector,
   wherein the first imaging optical system, the optical deflector and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction,
   an angle $\theta M$ formed by an optical axis of the light beam traveling to the curved mirror and the plane containing the normal to the curved mirror at its vertex and being parallel to the main scanning direction satisfies $10<\theta M<35$,
   the curved mirror also is part of the detecting optical system, and
   in the cross section taken along a sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction.

2. The light scanner according to claim 1, wherein the light beam emitted from the light source portion has a wavelength of 500 nm or less.

3. The light scanner according to claim 1, satisfying $$1.6 < \theta M/\theta P + 0.98 L/(L+D) < 2.2$$

where θP is an angle between an optical axis of the light beam from the first imaging optical system and the normal to the deflection surface of the optical deflector, L is a distance between the deflection surface of the optical deflector and the vertex of the curved mirror, and D is a distance between the vertex of the curved mirror and the surface to be scanned.

4. The light scanner according to claim 3, satisfying $$1.86 < \theta M/\theta P + 0.98 L/(L+D) < 1.94. \quad \text{Eq. 2.}$$

5. The light scanner according to claim 1, satisfying $$0.48 < L/(L+D) < 0.75 \quad \text{Eq. 3}$$

where L is a distance between the deflection surface of the optical deflector and the vertex of the curved mirror and D is a distance between the vertex of the curved mirror and the surface to be scanned.

6. The light scanner according to claim 1, wherein the curved mirror has an arc-shaped cross section in the sub-scanning direction.

7. The light scanner according to claim 1, wherein the curved mirror has a shape for correcting bend of a scanning line caused by oblique incidence of the light beam.

8. The light scanner according to claim 1, wherein the curved mirror has a shape that is asymmetrical with respect to the plane containing the normal to the curved mirror at its vertex and being parallel to the main scanning direction.

9. The light scanner according to claim 1, wherein the curved mirror is twisted so that the normal at each point, except the vertex, on a generatrix is not contained in the plane containing the normal to the curved mirror at its vertex and being parallel to the main scanning direction, the generatrix being a curved line intersecting with the plane containing the normal to the curved mirror at its vertex and being parallel to the main scanning direction.

10. The light scanner according to claim 9, wherein the angle formed by the normal at each point on the generatrix and the plane containing the normal to the curved mirror at its vertex and being parallel to the main scanning direction becomes larger as a distance between the vertex and each point increases.

11. The light scanner according to claim 9, wherein when a direction in which a reflected light beam from the curved mirror with respect to an incident light beam from the deflection surface of the optical deflector is identified as a positive direction, a direction in which the normal at each point on the generatrix tilts with respect to the plane containing the normal to the curved mirror at its vertex and being parallel to the main scanning direction is identified as a positive direction.

12. The light scanner according to claim 1, wherein the curved mirror is an anamorphic mirror whose radius of curvature at its vertex is different in the main scanning direction and in the sub-scanning direction.

13. The light scanner according to claim 1, wherein the curved mirror has concave mirror surfaces in the main scanning direction and in the sub-scanning direction.

14. The light scanner according to claim 1, wherein the curved mirror has a mirror surface whose refractive power in the sub-scanning direction is different in a center and a periphery of the main scanning direction.

15. The light scanner according to claim 1, wherein the curved mirror is shaped so that a radius of curvature of a cross section in the sub-scanning direction is not affected by the shape of a cross section in the main scanning direction.

16. The light scanner according to claim 1, wherein the first imaging optical system converges the light beam from the light source portion in the main scanning direction.

17. The light scanner according to claim 1, wherein the light source portion includes a wavelength-variable light source and a wavelength control portion.

18. The light scanner according to claim 1, further comprising a light combining means,
wherein the light source portion has at least two light sources and the light combining means is placed between the light source portion and the optical deflector so as to combine a plurality of light beams emitted from the at least two light sources.

19. The light scanner according to claim 18, further comprising a light separating means placed between the optical deflector and the surface to be scanned so as to separate the light beam combined by the light combining means into a plurality of light beams.

20. The light scanner according to claim 18, wherein light beams emitted from the at least two light sources have different wavelengths.

21. An image forming apparatus comprising the light scanner according to claim 1.

22. A light scanner comprising:
a light source portion for emitting a light beam having a predetermined wavelength;
an optical deflector for scanning the light beam from the light source portion;
a first imaging optical system placed between the light source portion and the optical deflector for guiding the light beam from the light source portion to a deflection surface of the optical deflector;
a second imaging optical system of a single curved mirror placed between the optical deflector and a surface to be scanned for guiding the light beam from the optical deflector to the surface to be scanned;
a scanning start signal detector for detecting the light beam scanned by the optical deflector; and
a detecting optical system placed between the optical deflector and the scanning start signal detector for guiding the light beam scanned by the optical deflector to the scanning start signal detector,
wherein the light source portion, the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction,
an angle θM formed by an optical axis of the light beam traveling to the curved mirror and the plane containing the normal to the curved mirror at its vertex and being parallel to the main scanning direction satisfies 10<θM<35,
the light beam traveling from the curved mirror to the surface to be scanned is substantially equal to that traveling from the curved mirror to the scanning start signal detector, and in the cross section taken along a sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction.

23. A light scanner comprising:

a light source portion for emitting a light beam having a predetermined wavelength;

an optical deflector for scanning the light beam from the light source portion;

a first imaging optical system placed between the light source portion and the optical deflector for guiding the light beam from the light source portion to a deflection surface of the optical deflector;

a second imaging optical system of a single curved mirror placed between the optical deflector and a surface to be scanned for guiding the light beam from the optical deflector to the surface to be scanned;

a scanning start signal detector for detecting the light beam scanned by the optical deflector; and a detecting optical system placed between the optical deflector and the scanning start signal detector for guiding the light beam scanned by the optical deflector to the scanning start signal detector, wherein the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction, the light beam traveling from the curved mirror to the surface to be scanned is substantially equal to that traveling from the curved mirror to the scanning start signal detector, and in the cross section taken along a sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction.

24. A light scanner comprising:

a light source portion for emitting a light beam having a predetermined wavelength;

an optical deflector for scanning the light beam from the light source portion;

a first imaging optical system placed between the light source portion and the optical deflector for guiding the light beam from the light source portion to a deflection surface of the optical deflector;

a second imaging optical system of a single curved mirror placed between the optical deflector and a surface to be scanned for guiding the light beam from the optical deflector to the surface to be scanned;

a scanning start signal detector for detecting the light beam scanned by the optical deflector; and a detecting optical system placed between the optical deflector and the scanning start signal detector for guiding the light beam scanned by the optical deflector to the scanning start signal detector, wherein the light source portion, the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction, an angle $\theta M$ formed by an optical axis of the light beam traveling to the curved mirror and the plane containing the normal to the curved mirror at its vertex and being parallel to the main scanning direction satisfies $10<\theta M<35$, the light beam traveling from the curved mirror to the surface to be scanned is substantially equal to that traveling from the curved mirror to the scanning start signal detector, and the light source portion is turned on so as to perform automatic power control operation at any time during a period between completion of a present scanning of a printing region followed by transmission of a light beam through a portion of the surface to be scanned that corresponds to an end of a recording paper and detection of a light beam of the next scanning by the scanning start signal detector.

25. A light scanner comprising:

a light source portion for emitting a light beam having a predetermined wavelength;

an optical deflector for scanning the light beam from the light source portion;

a first imaging optical system placed between the light source portion and the optical deflector for guiding the light beam from the light source portion to a deflection surface of the optical deflector;

a second imaging optical system of a single curved mirror placed between the optical deflector and a surface to be scanned for guiding the light beam from the optical deflector to the surface to be scanned;

a scanning start signal detector for detecting the light beam scanned by the optical deflector; and a detecting optical system placed between the optical deflector and the scanning start signal detector for guiding the light beam scanned by the optical deflector to the scanning start signal detector, wherein the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction, the light beam traveling from the curved mirror to the surface to be scanned is substantially equal to that traveling from the curved mirror to the scanning start signal detector, and the light source portion is turned on so as to perform automatic power control operation at any time during a period between completion of a present scanning of a printing region followed by transmission of a light beam through a portion of the surface to be scanned that corresponds to an end of a recording paper and detection of a light beam of the next scanning by the scanning start signal detector.

26. A color image forming apparatus comprising:
a plurality of image forming units for different colors, each comprising a developing device and a photosensitive member and being held to form a cylinder;
a conveying means for moving each of the image forming units between an image forming position and a waiting position by rotating the image forming units simultaneously around an axis of the cylinder;
a transfer means for forming a color toner image on a member to be transferred by bringing the photosensitive member of the image forming unit at the image forming position into contact with the member to be transferred and successively transferring toner images of different colors formed on each of the photosensitive members to the member to be transferred in accordance with switching of the image forming units to be positioned in the image forming position so as to superimpose the toner images of different colors; and
a light scanner for exposing the photosensitive member, wherein the light scanner comprises:
a light source portion for emitting a light beam having a predetermined wavelength;
an optical deflector for scanning the light beam from the light source portion;
a first imaging optical system placed between the light source portion and the optical deflector for guiding the light beam from the light source portion to a deflection surface of the optical deflector;
a second imaging optical system of a single curved mirror placed between the optical deflector and a surface to be scanned for guiding the light beam from the optical deflector to the surface to be scanned;
a scanning start signal detector for detecting the light beam scanned by the optical deflector; and
a detecting optical system placed between the optical deflector and the scanning start signal detector for guiding the light beam scanned by the optical deflector to the scanning start signal detector,
wherein the first imaging optical system, the optical deflector and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction,
an angle θM formed by an optical axis of the light beam traveling to the curved mirror and the plane containing the normal to the curved mirror at its vertex and being parallel to the main scanning direction satisfies 10<θM<35,
the curved mirror also is part of the detecting optical system, and
in the cross section taken along a sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction.

27. The color image forming apparatus according to claim 26, wherein the curved mirror constituting the second imaging optical system of the light scanner is located close to the axis of the cylinder.

28. The color image forming apparatus according to claim 26, wherein the angle θM satisfies 12.5<θM<17.5.

29. A color image forming apparatus comprising:
a plurality of image forming units for different colors, each comprising a developing device and a photosensitive member and being held to form a cylinder;
a conveying means for moving each of the image forming units between an image forming position and a waiting position by rotating the image forming units simultaneously around an axis of the cylinder;
a transfer means for forming a color toner image on a member to be transferred by bringing the photosensitive member of the image forming unit at the image forming position into contact with the member to be transferred and successively transferring toner images of different colors formed on each of the photosensitive members to the member to be transferred in accordance with switching of the image forming units to be positioned in the image forming position so as to superimpose the toner images of different colors; and
a light scanner for exposing the photosensitive member, wherein the light scanner comprises:
a light source portion for emitting a light beam having a predetermined wavelength;
an optical deflector for scanning light beam from the light source portion;
a first imaging optical system placed between the light source portion and the optical deflector for guiding the light beam from the light source portion to a deflection surface of the optical deflector;
a second imaging optical system of a single curved mirror placed between the optical deflector and a surface to be scanned for guiding the light beam from the optical deflector to the surface to be scanned;
a scanning start signal detector for detecting the light beam scanned by the optical deflector; and
a detecting optical system placed between the optical deflector and the scanning start signal detector for guiding the light beam scanned by the optical deflector to the scanning start signal detector,
wherein the light source portion, first imaging optical system, the optical deflector and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction,
an angle θM formed by an optical axis of the light beam traveling to the curved mirror and the plane containing the normal to the curved mirror at its vertex and being parallel to the main scanning direction satisfies 10<θM<35,
the light beam traveling from the curved mirror to the surface to be scanned is substantially equal to that traveling from the curved mirror to the scanning start signal detector, and in the cross section taken along a sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction.

30. The color image forming apparatus according to claim 29, wherein the curved mirror constituting the second imaging optical system of the light scanner is located close to the axis of the cylinder.

31. The color image forming apparatus according to claim 29, wherein the angle θM satisfies 12.5<θM<17.5.

32. A color image forming apparatus comprising:
a plurality of image forming units for different colors, each comprising a developing device and a photosensitive member and being held to form a cylinder;
a conveying means for moving each of the image forming units between an image forming position and a waiting position by rotating the image forming units simultaneously around an axis of the cylinder;
a transfer means for forming a color toner image on a member to be transferred by bringing the photosensitive member of the image forming unit at the image forming position into contact with the member to be transferred and successively transferring toner images of different colors formed on each of the photosensitive members to the member to be transferred in accordance with switching of the image forming units to be positioned in the image forming position so as to superimpose the toner images of different colors; and
a light scanner for exposing the photosensitive member, wherein the light scanner comprises:
a light source portion for emitting a light beam having a predetermined wavelength;
an optical deflector for scanning the light beam from the light source portion;
a first imaging optical system placed between the light source portion and the optical deflector for guiding the light beam from the light source portion to a deflection surface of the optical deflector;
a second imaging optical system of a single curved mirror placed between the optical deflector and a surface to be scanned for guiding the light beam from the optical deflector to the surface to be scanned;
a scanning start signal detector for detecting the light beam scanned by the optical deflector; and
a detecting optical system placed between the optical deflector and the scanning start signal detector for guiding the light beam scanned by the optical deflector to the scanning start signal detector,
wherein the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction
the light beam traveling from the curved mirror to the surface to be scanned is substantially equal to that traveling from the curved mirror to the scanning start signal detector, and in the cross section taken along a sub-scanning direction, when the angle of a reflected light beam from the deflection surface of the optical deflector with respect to an incident light beam from the first imaging optical system is measured in a positive direction, the angle of a reflected light beam from the curved mirror with respect to an incident light beam from the deflection surface is measured in a negative direction.

33. The color image forming apparatus according to claim 32, wherein the curved mirror constituting the second imaging optical system of the light scanner is located close to the axis of the cylinder.

34. A color image forming apparatus comprising:
a plurality of image forming units for different colors, each comprising a developing device and a photosensitive member and being held to form a cylinder;
a conveying means for moving each of the image forming units between an image forming position and a waiting position by rotating the image forming units simultaneously around an axis of the cylinder;
a transfer means for forming a color toner image on a member to be transferred by bringing the photosensitive member of the image forming unit at the image forming position into contact with the member to be transferred and successively transferring toner images of different colors formed on each of the photosensitive members to the member to be transferred in accordance with switching of the image forming units to be positioned in the image forming position so as to superimpose the toner images of different colors; and
a light scanner for exposing the photosensitive member, wherein the light scanner comprises:
a light source portion for emitting a light beam having a predetermined wavelength;
an optical deflector for scanning light beam from the light source portion;
a first imaging optical system placed between the light source portion and the optical deflector for guiding the light beam from the light source portion to a deflection surface of the optical deflector;
a second imaging optical system of a single curved mirror placed between the optical deflector and a surface to be scanned for guiding the light beam from the optical deflector to the surface to be scanned;
a scanning start signal detector for detecting the light beam scanned by the optical deflector; and
a detecting optical system placed between the optical deflector and the scanning start signal detector for guiding the light beam scanned by the optical deflector to the scanning start signal detector,
wherein the light source portion, the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction,
an angle θM formed by an optical axis of the light beam traveling to the curved mirror and the plane containing the normal to the curved mirror at its vertex and being parallel to the main scanning direction satisfies 10<θM<35, the light beam traveling from the curved mirror to the surface to be scanned is substantially equal to that traveling from the curved mirror to the scanning start signal detector, and the light source portion is turned on so as to perform automatic power control operation at any time during a period between completion of a present scanning of a printing region followed by transmission of a light beam through a portion of the surface to be scanned that corresponds to an end of a recording paper and detection of a light beam of the next scanning by the scanning start signal detector.

35. The color image forming apparatus according to claim 34, wherein the curved mirror constituting the second imaging optical system of the light scanner is located close to the axis of the cylinder.

36. The color image forming apparatus according to claim 34, wherein the angle θM satisfies 12.5<θM<17.5.

37. A color image forming apparatus comprising:

a plurality of image forming units for different colors, each comprising a developing device and a photosensitive member and being held to form a cylinder;

a conveying means for moving each of the image forming units between an image forming position and a waiting position by rotating the image forming units simultaneously around an axis of the cylinder;

a transfer means for forming a color toner image on a member to be transferred by bringing the photosensitive member of the image forming unit at the image forming position into contact with the member to be transferred and successively transferring toner images of different colors formed on each of the photosensitive members to the member to be transferred in accordance with switching of the image forming units to be positioned in the image forming position so as to superimpose the toner images of different colors; and a light scanner for exposing the photosensitive member, wherein the light scanner comprises:

a light source portion for emitting a light beam having a predetermined wavelength;

an optical deflector for scanning the light beam from the light source portion;

a first imaging optical system placed between the light source portion and the optical deflector for guiding the light beam from the light source portion to a deflection surface of the optical deflector;

a second imaging optical system of a single curved mirror placed between the optical deflector and a surface to be scanned for guiding the light beam from the optical deflector to the surface to be scanned;

a scanning start signal detector for detecting the light beam scanned by the optical deflector; and a detecting optical system placed between the optical deflector and the scanning start signal detector for guiding the light beam scanned by the optical deflector to the scanning start signal detector, wherein the first imaging optical system, the optical deflector, and the second imaging optical system are located at different positions in a sub-scanning direction so that the light beam from the first imaging optical system enters obliquely with respect to a plane containing a normal to the deflection surface of the optical deflector and being parallel to a main scanning direction, and the light beam from the optical deflector enters obliquely with respect to a plane containing a normal to the curved mirror at its vertex and being parallel to the main scanning direction, the light beam traveling from the curved mirror to the surface to be scanned is substantially equal to that traveling from the curved mirror to the scanning start signal detector, and the light source portion is turned on so as to perform automatic power control operation at any time during a period between completion of a present scanning of a printing region followed by transmission of a light beam through a portion of the surface to be scanned that corresponds to an end of a recording paper and detection of a light beam of the next scanning by the scanning start signal detector.

38. The color image forming apparatus according to claim 37, wherein the curved mirror constituting the second imaging optical system of the light scanner is located close to the axis of the cylinder.

* * * * *